(12) United States Patent
Takano et al.

(10) Patent No.: US 12,460,372 B2
(45) Date of Patent: Nov. 4, 2025

(54) WORKING MACHINE

(71) Applicant: KUBOTA CORPORATION, Osaka (JP)

(72) Inventors: Yuki Takano, Sakai (JP); Tsutomu Aizawa, Sakai (JP); Tetsuji Matsushita, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 1055 days.

(21) Appl. No.: 17/487,768

(22) Filed: Sep. 28, 2021

(65) Prior Publication Data

US 2022/0018089 A1 Jan. 20, 2022

Related U.S. Application Data

(63) Continuation of application No. PCT/JP2019/050913, filed on Dec. 25, 2019.

(30) Foreign Application Priority Data

| Mar. 29, 2019 | (JP) | 2019-066394 |
| Mar. 29, 2019 | (JP) | 2019-066396 |
| Mar. 29, 2019 | (JP) | 2019-066399 |

(51) Int. Cl.
  *E02F 3/36* (2006.01)
  *E02F 3/38* (2006.01)
  *E02F 3/43* (2006.01)

(52) U.S. Cl.
  CPC .......... *E02F 3/3663* (2013.01); *E02F 3/384* (2013.01); *E02F 3/431* (2013.01)

(58) Field of Classification Search
  CPC ......... E02F 3/3663; E02F 3/384; E02F 3/431; B60T 15/025; B60T 13/686; B60T 13/22; B60W 10/18; B60W 2540/12
  See application file for complete search history.

(56) References Cited

U.S. PATENT DOCUMENTS 3,897,840 A * 8/1975 Molzahn ............... B62D 11/183
  180/6.48
4,114,738 A * 9/1978 Brown .................. B60W 10/10
  192/218

(Continued)

FOREIGN PATENT DOCUMENTS

EP   3 550 082 A1   10/2019
JP   49-2225 A   1/1974

(Continued)

OTHER PUBLICATIONS

Extended European Search Report for European Application No. 19922987.3, dated Dec. 5, 2022.

(Continued)

*Primary Examiner* — Jason D Shanske
*Assistant Examiner* — Scott Lawrence Strickler
(74) *Attorney, Agent, or Firm* — Birch, Stewart, Kolasch & Birch, LLP

(57) ABSTRACT

A working machine includes a machine body, a traveling device travelably supporting the machine body, a hydraulic driving device to hydraulically drive the traveling device, a floor frame supported on the machine body via a mounting member, a pedal operable to brake the traveling device, the inching valve to change a flow rate of hydraulic fluid supplied to the hydraulic driving device according to operation of the pedal, and a cable operably connecting the pedal to the inching valve. The pedal and the inching valve are attached to the floor frame.

5 Claims, 24 Drawing Sheets

(56) References Cited

U.S. PATENT DOCUMENTS

| | | | | |
|---|---|---|---|---|
| 4,281,737 | A | * | 8/1981 | Molzahn ................. B60T 11/04 |
| | | | | 192/221 |
| 4,321,980 | A | * | 3/1982 | Nissen ................... G05G 9/047 |
| | | | | 180/6.48 |
| 4,553,626 | A | | 11/1985 | Kazmierczak et al. |
| 2008/0136207 | A1 | | 6/2008 | Aoyama et al. |
| 2017/0174141 | A1 | * | 6/2017 | Jhant ......................... B60R 5/00 |
| 2018/0087478 | A1 | | 3/2018 | Matsumiya et al. |

FOREIGN PATENT DOCUMENTS

| | | | |
|---|---|---|---|
| JP | 53-129031 | U | 10/1978 |
| JP | 3-248929 | A | 11/1991 |
| JP | 5-27422 | U | 4/1993 |
| JP | 6-88356 | A | 3/1994 |
| JP | 7-9847 | A | 1/1995 |
| JP | 8-253168 | A | 10/1996 |
| JP | 10-1062 | A | 1/1998 |
| JP | 2002-294761 | A | 10/2002 |
| JP | 2003-49452 | A | 2/2003 |
| JP | 2006-105268 | A | 4/2006 |
| JP | 2008-131229 | A | 5/2006 |
| JP | 2008-143209 | A | 6/2008 |
| JP | 2009-8130 | A | 1/2009 |
| JP | 2009-12687 | A | 1/2009 |
| JP | 2012-144190 | A | 8/2012 |
| JP | 2012-224213 | A | 11/2012 |
| JP | 2018-53811 | A | 4/2018 |
| JP | 2019-7227 | A | 1/2019 |

OTHER PUBLICATIONS

Japanese Office Action for corresponding Japanese Application No. 2019-066399, dated Aug. 30, 2022, with English translation.

* cited by examiner

WORKING MACHINE

CROSS REFERENCE TO RELATED APPLICATIONS

This application is a continuation application of International Application No. PCT/JP2019/050913, filed on Dec. 25, 2019, which claims the benefit of priority to Japanese Patent Application No. 2019-066394, filed on Mar. 29, 2019, and to Japanese Patent Application No. 2019-066396, filed on Mar. 29, 2019, and to Japanese Patent Application No. 2019-066399, filed on Mar. 29, 2019. The entire contents of each of these applications are hereby incorporated herein by reference.

BACKGROUND OF THE INVENTION

Field of the Invention

The present invention relates to a working machine such as a wheel loader.

Description of the Related Art

Working machines disclosed in Japanese Unexamined Patent Application Publication No. 2012-224213, Japanese Unexamined Patent Application Publication No. 2019-7227, Japanese Unexamined Patent Application Publication No. 2012-144190 are known.

The working machine disclosed in Japanese Unexamined Patent Application Publication No. 2012-224213 has a hydraulic drive unit configured to drive a traveling device with a hydraulic pressure, and an inching valve configured to discharge, to a hydraulic fluid tank, hydraulic fluid that controls the hydraulic drive unit when depressing a pedal and to provide a braking force to the hydraulic drive unit. The inching valve is installed directly under the pedal, and a spool of the inching valve is interlocked and operably connected to the pedal.

The working machine disclosed in Japanese Unexamined Patent Application Publication No. 2019-7227 has a cabin surrounding an operator's seat mounted on the machine body. This cabin has openable entrance doors on one side portion of the operator's seat and on the other side portion. Accordingly, in the technique of Japanese Unexamined Patent Application Publication No. 2019-7227, it is possible to board on and alight from the cabin from both the one side portion and the other side portion of the operator's seat.

In the working machine disclosed in Japanese Unexamined Patent Application Publication No. 2012-144190, an air-conditioner main unit for air conditioning is provided to a rear portion of a room of the cabin. An inside-air introducing port to take the inside-air of the room of the cabin interior is provided on a front surface side of the air-conditioner main unit. In addition, an outside-air introducing port to take, into the air-conditioner main unit, the outside-air outside the room of the cabin is provided on a side surface of the cabin. The outside-air introducing port is connected to the air-conditioner main unit with a duct.

SUMMARY OF THE INVENTION

However, depending on a supporting structure of the pedal, it may be difficult to arrange the inching valve directly under the pedal due to space constraints.

In addition, depending on the working machine, it may be desired to make one side portion of the operator's seat be defined as an entrance passage, and prohibit boarding on and alighting from the other side portion.

In addition, the working machine disclosed in Japanese Unexamined Patent Application Publication No. 2012-144190 needs to be provided with both of a filter for inside-air and a filter for outside-air because positions of the inside-air introducing port and the outside-air introducing port are far apart. In addition, a large space is required to install an inside-air/outside-air switching portion that is switched between the inside-air introducing state and the outside-air introducing state.

In view of the aforementioned problems, the present invention intends to improve flexibility of a mounting position of the inching valve.

In addition, the present invention intends to prevent an operator from boarding and alighting through an opposite side to an entrance passage.

In addition, the present invention intends to provide a working machine in which a filter can be shared and an inside-air/outside-air switching portion can be compactly formed.

A working machine according to one aspect of the present invention includes a machine body, a traveling device travelably supporting the machine body, a hydraulic driving device to hydraulically drive the traveling device, a floor frame supported on the machine body via a mounting member, a pedal operable to brake the traveling device, an inching valve to change a flow rate of hydraulic fluid supplied to the hydraulic driving device according to operation of the pedal, and a cable operably connecting the pedal to the inching valve. The pedal and the inching valve are attached to the floor frame.

In addition, the floor frame includes an installation part supporting an operator's seat, and the inching valve is attached to the installation part below the operator's seat.

In addition, the floor frame includes an inspection opening, and the inching valve is disposed below the inspection opening so as to be accessible via the inspection opening.

In addition, the floor frame includes a floor part forward of the installation part, the floor part includes a floor main body including the inspection opening, and an openable cover closing the inspection opening, and the inching valve is disposed below the openable cover.

In addition, the inching valve includes a valve lever operably connected to the cable, and a valve main body to which the valve lever is attached, and the valve main body changes the flow rate of hydraulic fluid supplied to the hydraulic driving device according to rotation of the valve lever around a vertical axis by operating the pedal.

In addition, the working machine further includes a hydraulic pump to deliver the hydraulic fluid, and a hydraulic fluid tank disposed on a lateral side of the inching valve. The valve main body includes a back surface with a first joint port fluidly connected to a delivery circuit of the hydraulic pump, a side surface, facing toward the hydraulic fluid tank, with a second joint port fluidly connected to the hydraulic fluid tank, and an upper surface with an operation shaft operably connected to the valve lever.

In addition, the working machine further includes a frame member extended upward from a front portion of the floor frame, the pedal being attached to the frame member, a first cable stay fixed to the frame member, one end portion of the cable being attached to the first cable stay, an attachment bracket fixed to the installation part, a valve bracket attached to the attachment bracket, the inching valve being attached to the valve bracket, and a second cable stay attached to the valve bracket, the other end portion of the cable being attached to the second cable stay.

A working machine according to another aspect of the present invention includes a machine body, an operator's seat mounted on the machine body, an opening part provided opposed to a entrance passage that is provided on one side portion of the operator's seat, and provided to connect a space on the floor part disposed forward of the operator's seat to the outside of the machine body, and a blocking member blocking an operator from boarding and alighting through the opening part.

In addition, the working machine includes a cabin having a first door disposed in the entrance passage and a second door disposed in the opening part. The blocking member prevents the operator from boarding and alighting through the second door.

In addition, the working machine includes a front strut disposed forward of the other side portion of the operator's seat, and a rear strut disposed behind the front strut and on the other side portion of the operator's seat. The second door is openably provided between the front strut and the rear strut.

In addition, the working machine includes an operation console provided on the other side portion of the operator's seat, and the front strut disposed forward of the other side portion of the operator's seat. The blocking member is provided to extend at least from the operation console and the front strut.

In addition, the operation console includes a front portion having an operation lever, and the blocking member is disposed at a position overlapping the operation lever in a sight direction of the operator's seating on the operator's seat.

In addition, the operator's seat includes a seat portion and a backrest, the blocking member is formed of a rod member and extends in a machine fore-and-aft direction, and is disposed downward of an upper end of the operation lever and upward of a bottom surface of the seat portion.

In addition, the working machine includes an attachment tab fixed to the front strut. The operation console includes a supporting bracket supporting the operation lever, and a console box covering the supporting bracket. The blocking member includes a front portion attached to the attachment tab and a rear portion attached to the supporting bracket in the console box.

In addition, the second door has light transmission properties.

A working machine according to further another aspect of the present invention includes a machine body, a cabin mounted on the machine body, an air-conditioner main unit for air-conditioning of a room of the cabin, and an inside-air/outside-air introducing portion to introduce, into the air-conditioner main unit, inside-air of the room of the cabin and outside-air outside the room. The inside-air/outside-air introducing portion includes an inside-air/outside-air switching portion and a filter housing portion. The inside-air/outside-air switching portion includes an inside-air introducing port through which the inside-air is taken, an outside-air introducing port through which the outside-air is taken, and a switching damper switchable between an outside-air introducing position for introducing the outside air from the outside-air introducing port and an inside-air introducing position for closing the outside-air introducing port. The filter housing portion is provided adjacent to the inside-air/outside-air switching portion and in communication to the inside-air/outside-air switching portion and the air-conditioner main unit, and is configured to house a filter capable of catching dusts included in the inside-air and outside-air flowing from the inside-air/outside-air switching portion to the air-conditioner main unit.

In addition, the working machine includes a prime mover, and a partition member defining a front surface of a prime mover room that houses the prime mover. The outside-air introducing port is disposed forward of the partition member in the machine body.

In addition, the working machine includes an operator's seat mounted on the machine body. The inside-air/outside-air introducing portion includes an inclined front wall disposed rearward of the operator's seat and extended rearwardly upward and a bottom wall extended rearward from the front wall. The inside-air introducing port is formed upward of the bottom wall to be closer to the front wall. The outside-air introducing port is formed on the bottom wall. The inside-air/outside-air switching portion includes a supporting boss disposed downward of the inside-air introducing port and forward of the outside-air introducing port and a switching lever being operable from the operator's seat side and pivotally supported by the supporting boss, and the switching damper is fixed to the switching lever.

In addition, the working machine includes a fuel tank disposed downward of the inside-air/outside-air switching portion. The bottom wall includes a first portion defining a bottom portion of the inside-air/outside-air switching portion and a second portion defining a bottom portion of the filter housing portion. The first portion is formed at a position higher than the second portion.

In addition, the working machine includes an introducing duct disposed upward of the air-conditioner main unit and connected to the air-conditioner main unit. The inside-air/outside-air switching portion and the filter housing portion are adjacent to each other in a machine width direction. The filter is arranged in a longitudinal direction in which surfaces of the filter face back and forth. The inside-air/outside-air switching portion is connected to the filter housing portion on a back side of the filter. The introducing duct includes an introducing port connected to the filter housing portion on a front side of and downward of the filter.

According to the working machine as mentioned above, by operably connecting the pedal and the inching valve with the cable, the flexibility of the mounting position of the inching valve can be improved. In addition, by attaching the pedal and the inching valve to the floor frame supported by the machine body via a mounting member, that is, to the same vibration system, the inching valve can be suppressed from being affected by traveling vibrations and working vibrations.

In addition, according to the working machine as mentioned above, by providing the entrance passage on one side portion of the operator's seat and providing an opening part on the other side portion, the advantages of improved ventilation and easy cleaning work of the floor part can be provided. In addition, the blocking member can prevent an operator from boarding and alighting through the opening part that is provided opposite to the entrance passage.

In addition, according to the working machine mentioned above, a filter can be shared for the inside-air and for the outside-air by providing adjacent to each other the inside-air/outside-air switching portion and the filter housing portion, the inside-air/outside-air switching portion being configured to be switched between a state in which the outside-air is introduced and a state in which the outside-air is not introduced, and the filter housing portion being configured to house the filter that removes dusts from the inside-air and the outside-air flowing from the inside-air/outside-air switching portion to the air-conditioner main unit. In addition, since the inside-air introducing port, the outside-air introducing port, and the switching damper are provided in one place, the inside-air/outside-air switching portion can be compactly formed.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
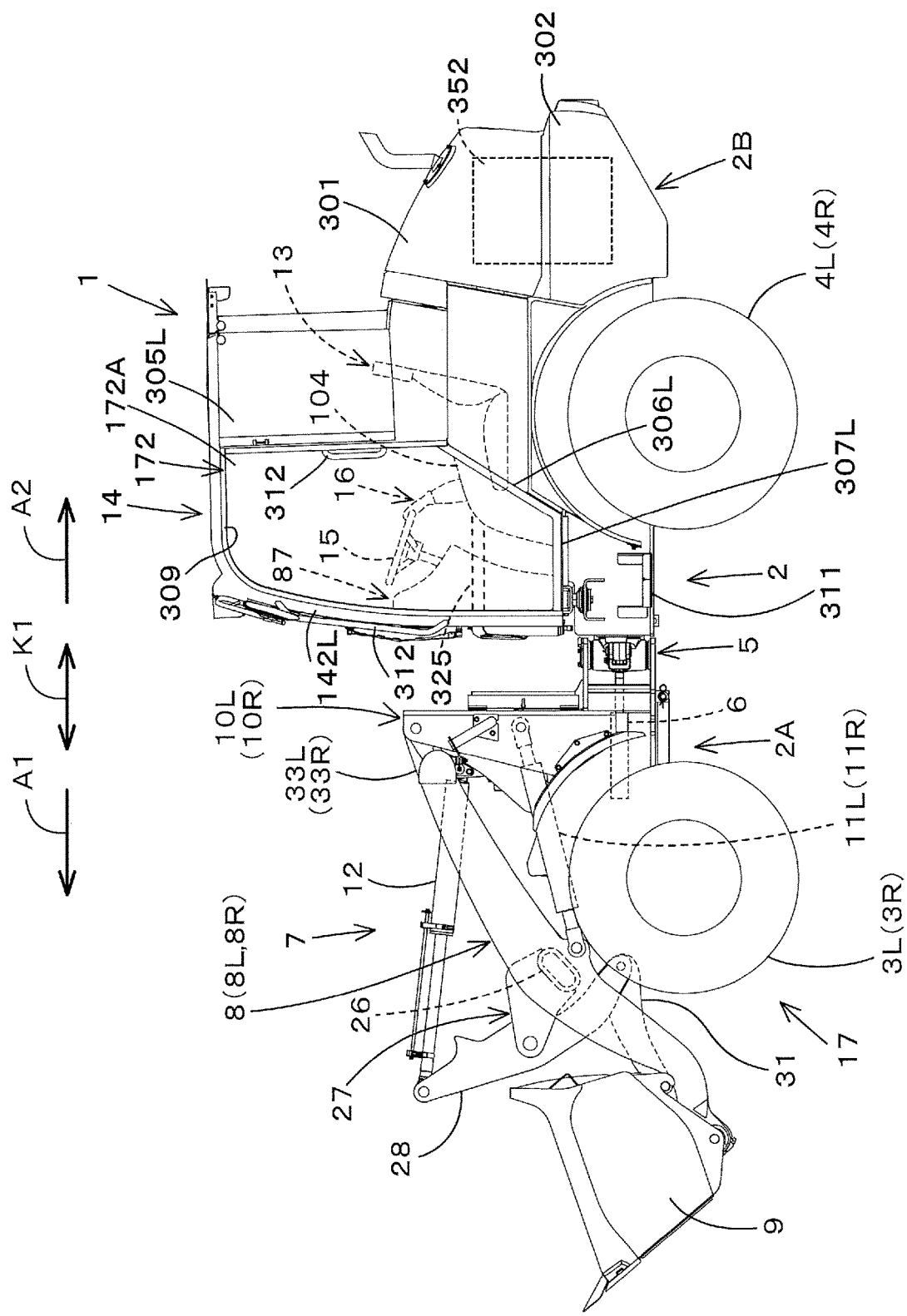
FIG. 1 is a side view of a working machine.

The preferred embodiments will now be described with reference to the accompanying drawings, wherein like reference numerals designate corresponding or identical elements throughout the various drawings. The drawings are to be viewed in an orientation in which the reference numerals are viewed correctly.

With appropriate reference to the drawings, an embodiment of the present invention will be described below.

Figure 2:
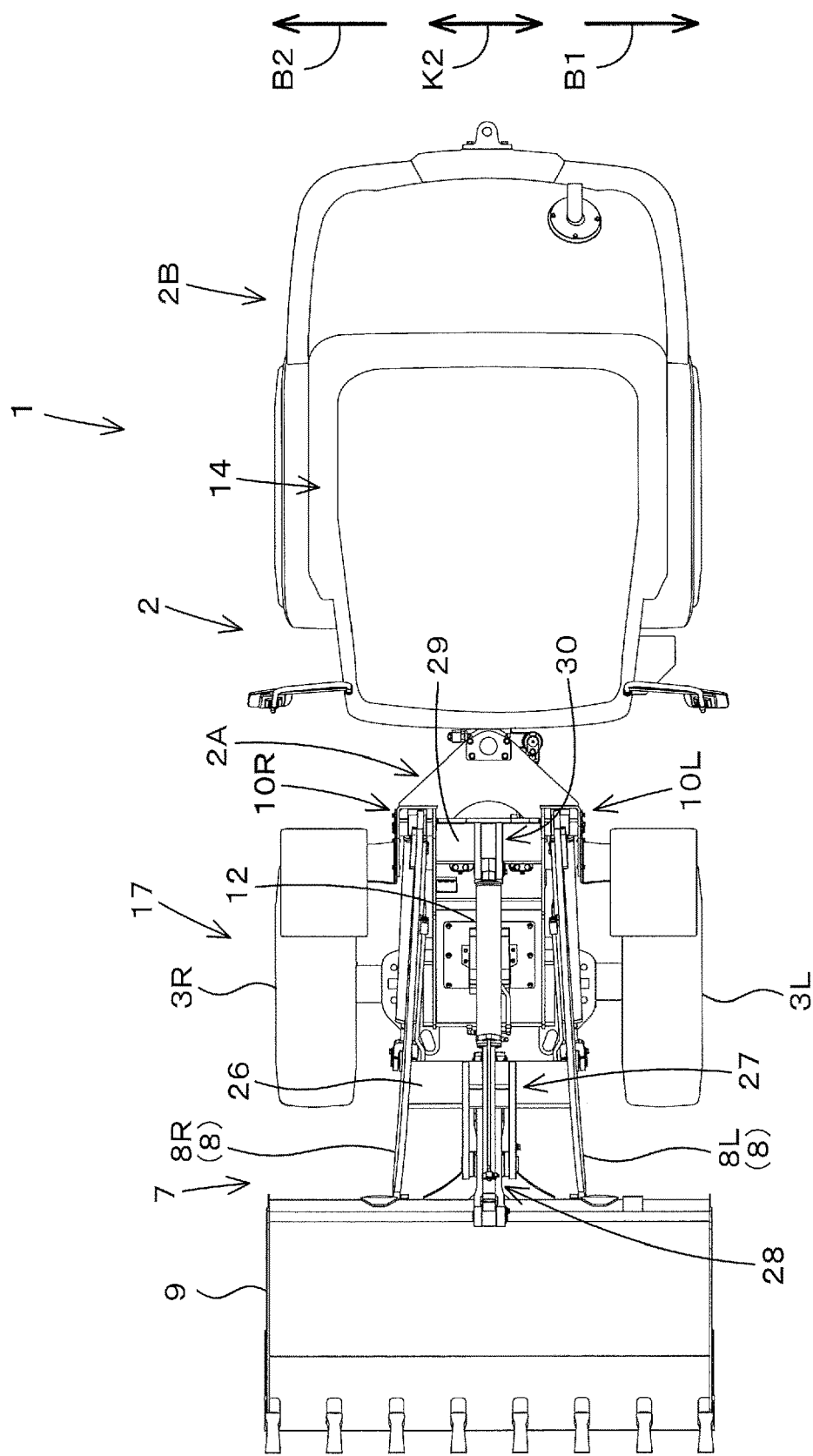
FIG. 2 is a plan view of the working machine.

FIG. 1 is a schematic side view showing an overall configuration of a working machine 1 according to the present embodiment. FIG. 2 is a schematic plan view of the working machine 1. In the present embodiment, a wheel loader is exemplified as the working machine 1.

As shown in FIGS. 1 and 2, a wheel loader according to the present embodiment is an articulated working machine 1, and a machine body 2 of the working machine 1 includes a front machine body 2A and a rear machine body 2B. The front machine body 2A is provided with a left front wheel 3L and a right front wheel 3R. The front wheel 3L is provided on a left portion of the front machine body 2A, and the front wheel 3R is provided on a right portion of the front machine body 2A. The rear machine body 2B is provided with a left rear wheel 4L and a right rear wheel 4R. The rear wheel 4L is provided on a left portion of the rear machine body 2B, and the rear wheel 4R is provided on a right portion of the rear machine body 2B. The front wheels 3L and 3R and the rear wheels 4L and 4R constitute a part of the traveling device 17 that travelably supports the machine 2. An operator's seat (seat) 13 on which an operator (driver) sits is mounted on the rear machine body 2B. The operator's seat 13 is disposed between the rear wheels 4L and 4R, and is provided in a center portion of the machine body 2 in a machine width direction K2.

In explanation of this embodiment, a forward direction (a direction indicated by an arrowed line A1 in FIGS. 1 and 2) of the operator's seated on the operator's seat 13 is referred to as "front" or "forward", a rearward direction (a direction indicated by an arrowed line A2 in FIGS. 1 and 2) of the operator is referred to as "rear" or "rearward", a leftward direction (front surface side of FIG. 1, a direction indicated by an arrowed line B1 in FIG. 2) of the operator is referred to as "left" or "leftward", and a rightward direction (a back surface side of FIG. 1, a direction indicated by an arrowed line B2 in FIG. 2) of the operator is referred to as "right" or "rightward".

In addition, a horizontal direction, which is orthogonal to a machine fore-and-aft direction K1, is referred to as the machine width direction K2 (see FIG. 2). Each of leftward and rightward directions from the center portion of the machine body 2 in the width direction is referred to as a machine outward direction. In other words, the machine outward direction is a direction separating away from the center portion of the machine body 2 in the machine width direction K2. The direction opposite to the machine outward direction is referred to as a machine inward direction. That is, the machine inward direction is a direction approaching the center portion of the machine body 2 in the machine width direction K2.

As shown in FIG. 1, a machine body joint member 5 is provided on a front end portion of the rear machine body 2B rotatably in a predetermined range around an axial center extending in the machine fore-and-aft direction K1, and a rear end portion of the front machine body 2A is jointed to the machine body joint member 5 swingably in the machine width direction K2 around a vertical axis (an axial center extending in a vertical direction).

A steering cylinder 6 consisted of a hydraulic cylinder is interposed between the machine body joint member 5 and the front machine body 2A. By extending and contracting this steering cylinder 6, the front machine body 2A is swung in the machine width direction K2 relative to the rear machine body 2B, and thus the working machine 1 can turn to the left or the right.

The rear machine body 2B is provided with a cabin 14 as an operator's seat protection device that surrounds the operator's seat 13. In a room of the cabin 14, a steering wheel 15 (steering member) for operating the steering cylinder 6 and a manipulation lever 16 for manipulating the working device 7 are provided. The steering wheel 15 is disposed in front of the operator's seat 13, and the manipulation lever 16 is disposed on a side portion (a right side portion) of the operator's seat 13.

In the following description, a room of the cabin 14 is referred to as a cabin interior, and an outside of the cabin 14 is referred to as a cabin exterior.

As shown in FIG. 1, a prime mover 352 is mounted on the rear machine body 2B. The prime mover 352 is, for example, a diesel engine. The operator's seat protection device may be a canopy instead of the cabin 14.

As shown in FIGS. 1 and 2, a working device 7 (front working device) is provided on the front machine body 2A. The working device 7 has lift arms 8 that are supported by the front machine body 2A (machine body 2) swingably up and down. The lift arms 8 include a left first arm 8L and a right second arm 8R juxtaposed at an interval therebetween in the machine width direction K2. The first arm 8L includes a base end portion (rear end portion) supported, rotatably around an axial center extending in the machine width direction K2, on an upper portion of a first supporting frame 10L erected on a left side portion of the front machine body 2A. Accordingly, the first arm 8L can be swung up and down. The second arm 8R includes a base end portion supported, rotatably around an axial center extending in the machine width direction K2, on an upper portion of a second supporting frame 10R erected on a right side portion of the front machine body 2A. Accordingly, the second arm 8R is also can be swung up and down. A working light (light) 33L is provided on a left side portion of an upper portion of the first supporting frame 10L. A working light (a kind of light) 33R is also provided on a right side portion of an upper portion of the second supporting frame 10R.

As shown in FIG. 5, the first arm 8L and the second arm 8R are provided with a clearance in the machine width direction K2, and the clearance is gradually widened as extending forward. This improves diagonally-leftward front visibility and diagonally-rightward front visibility of the operator's seated on the operator's seat 13. This makes it easy to check the front wheels 3L and 3R. Accordingly, it is easy to perform work while watching the front wheels 3L and 3R. It is also possible to perform the work while watching an outward portion of the working tool 9 in the machine outward direction. For example, when a pallet fork as the working tool 9 is attached to the working machine 1, it is possible to perform the work while watching toes of the pallet fork.

As shown in FIGS. 1 and 2, the first arm 8L and the second arm 8R are connected to each other via a connecting pipe 26 provided at longitudinally intermediate portions of the lift arms 8.

As shown in FIG. 1, a lift cylinder 11L is interposed between a longitudinally intermediate portion of the first arm 8L and a vertically intermediate portion of the first supporting frame 10L. A lift cylinder 11R is interposed between a longitudinally intermediate portion of the second arm 8R and a vertically intermediate portion of the second supporting frame 10R. The lift cylinder 11L and the lift cylinder 11R are constituted of double-action hydraulic cylinders. By extending and contracting the lift cylinder 11L and the lift cylinder 11R, the lift arms 8 are swung up and down (the first arm 8L and the second arm 8R are simultaneously swung).

As shown in FIGS. 1 and 2, the working device 7 includes the working tool 9 capable of being detachably attached to front portions of the lift arms 8. As for the working tool 9, a bucket is attached as standard equipment, and instead of the bucket, a working tool (attachment) such as a pallet fork, a mania fork, or the like, or a working tool with a hydraulic actuator (hydraulic attachment) such as a sweeper, a mower, a breaker, or the like can be attached. A back lower portion of the working tool 9 is connected to and pivotally supported by tip portions (front end portions) of the lift arms 8.

As shown in FIG. 1, the working machine 1 has a working tool cylinder 12 configured to drive the working tool 9. The working tool cylinder 12 is constituted of a double-action hydraulic cylinder. A bracket member 27 is fixed to the connecting pipe 26, and an intermediate portion of the swinging linkage 28 in the vertical direction is pivotally supported by the bracket member 27. One end of the working tool cylinder 12 is connected to an upper portion of the swinging linkage 28. The other end of the working tool cylinder 12 is pivotally supported by a bracket member 30 provided on a connecting member 29 that connects the first supporting frame 10L and the second supporting frame 10R to each other (see FIG. 12). A rear portion of an interlocking linkage 31 is pivotally supported by a lower portion of a swinging linkage 28. A front portion of the interlocking linkage 31 is pivotally supported by (engaged with) the back upper portion of the working tool 9. By extending and contracting the working tool cylinder 12, the swinging linkage 28 swings, and the interlocking linkage 31 moves back and forth. This causes the working tool 9 to swing up and down around a connecting point with the lift arms 8.

The front wheel 3L is provided forward of the first supporting frame 10L and leftward of the first arm 8L. The front wheel 3L is positioned rearward of a left portion of the working tool 9. The front wheel 3R is provided forward of the second supporting frame 10R and rightward of the second arm 8R. The front wheel 3R is positioned rearward of a right portion of the working tool 9.

Figure 3:
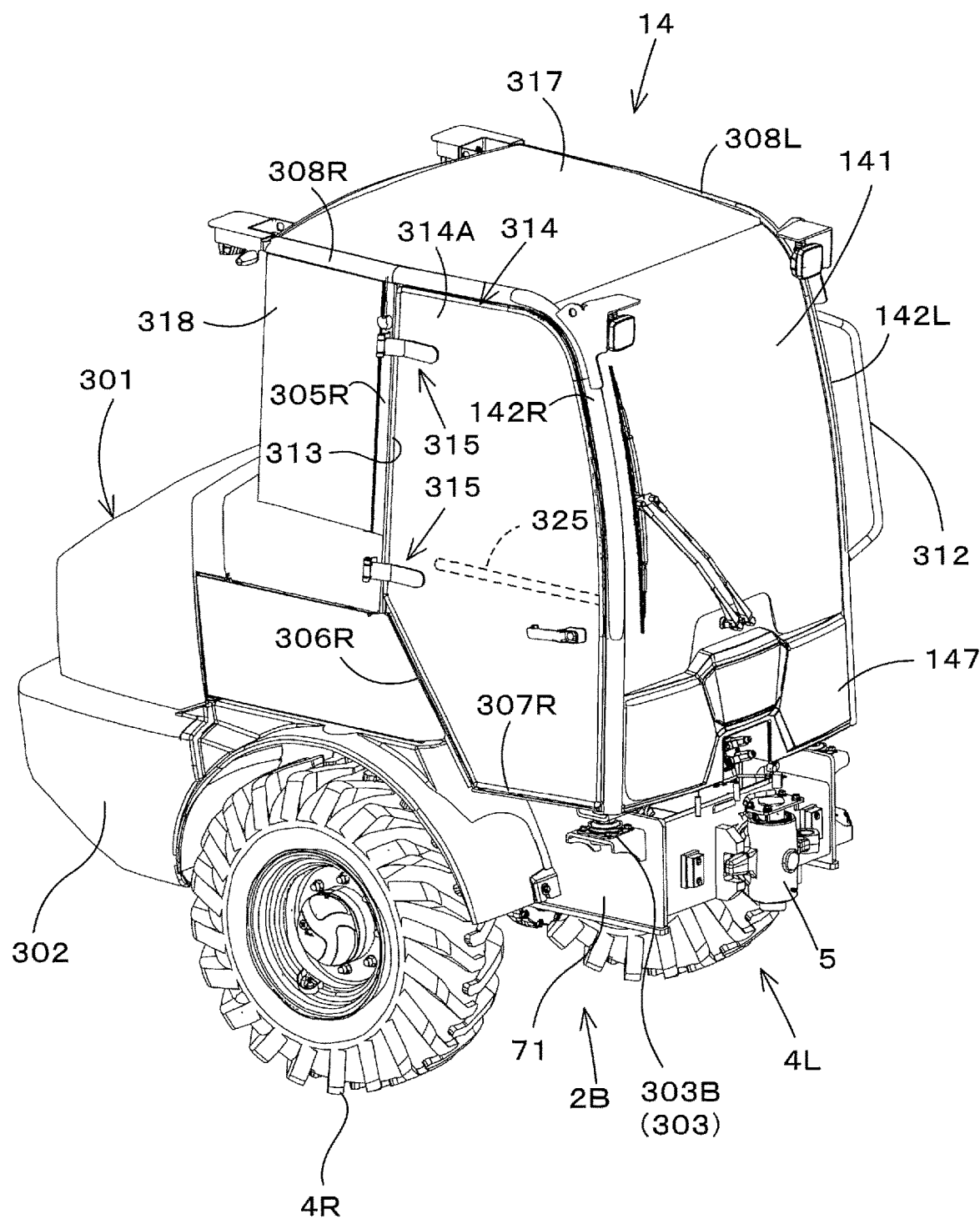
FIG. 3 is a perspective view of a rear portion of the working machine.
Figure 19:
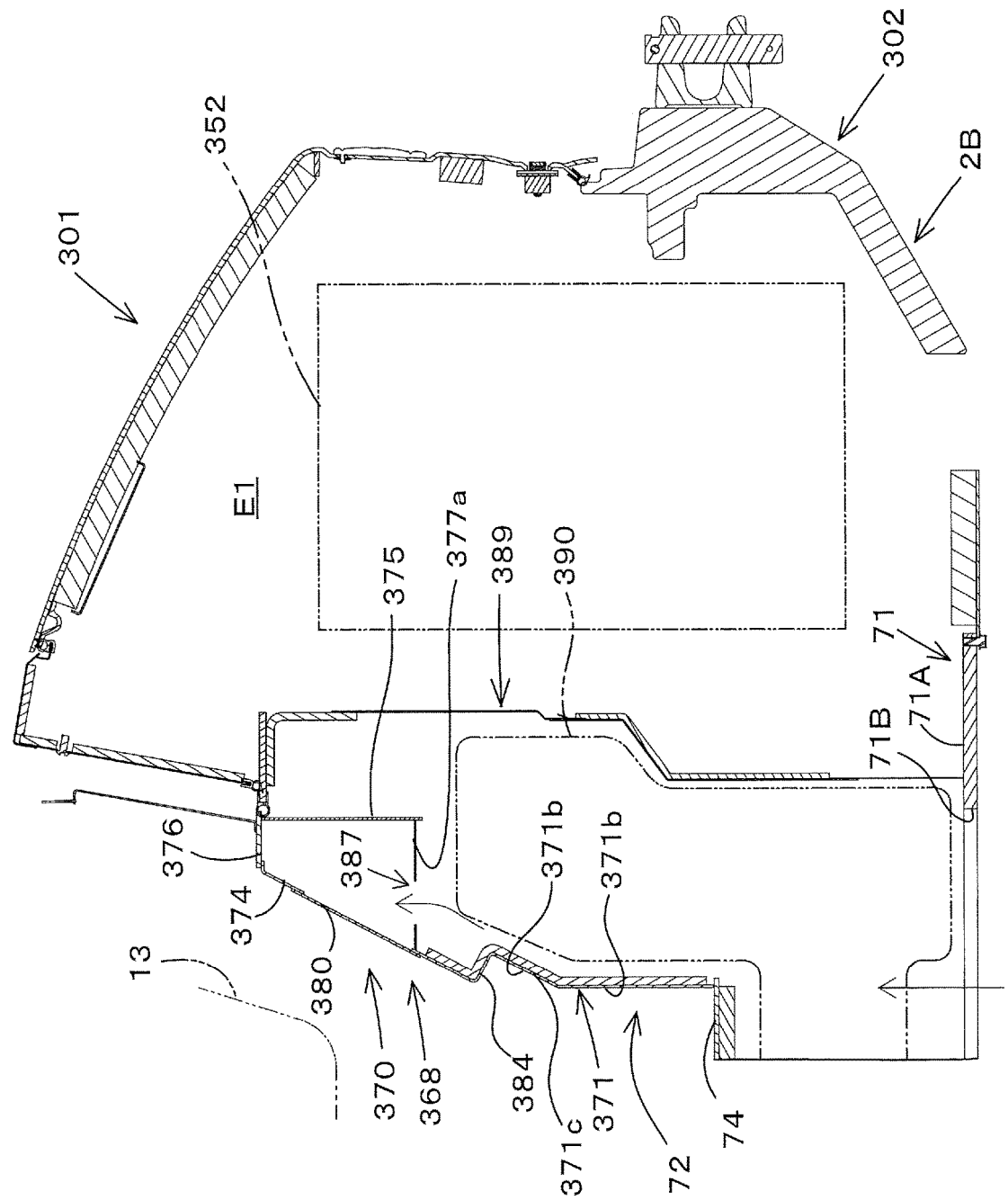
FIG. 19 is a cross section view of a rear portion of a machine body.

As shown in FIG. 3, the rear machine body 2B includes a machine body frame 71. The machine body frame 71 is travelably supported by the rear wheels 4L and 4R. The machine body joint member 5 is attached to a front portion of the machine body frame 71. As shown in FIG. 1, a hood 301 covering the prime mover 352 from above and a weight 302 disposed below the hood 301 are provided on a rear portion of the machine body frame 71. As shown in FIG. 19, the hood 301 and the weight 302 form a prime mover room (engine room) E1 that houses the prime mover 352.

As shown in FIGS. 3 to 5B, the cabin 14 has mounting members 303 each having an elastic member. A plurality of mounting members 303 are provided. In this embodiment, four mounting members (first mounting member 303A, second mounting member 303B, third mounting member 303C, and fourth mounting member 303D) are provided.

The first mounting member 303A is provided on a lower end of a left front portion of the cabin 14, and the second mounting member 303B is provided on a lower end of a right front portion of the cabin 14. The third mounting member 303C is provided on a lower end of a left rear portion of the cabin 14, and the fourth mounting member 303D is provided on a lower end of a right rear portion of the cabin 14. The cabin 14 is mounted on the machine body frame 71 (machine body 2) via the mounting members 303, and is supported by the machine body frame 71 in an anti-vibration manner.

Figure 4:
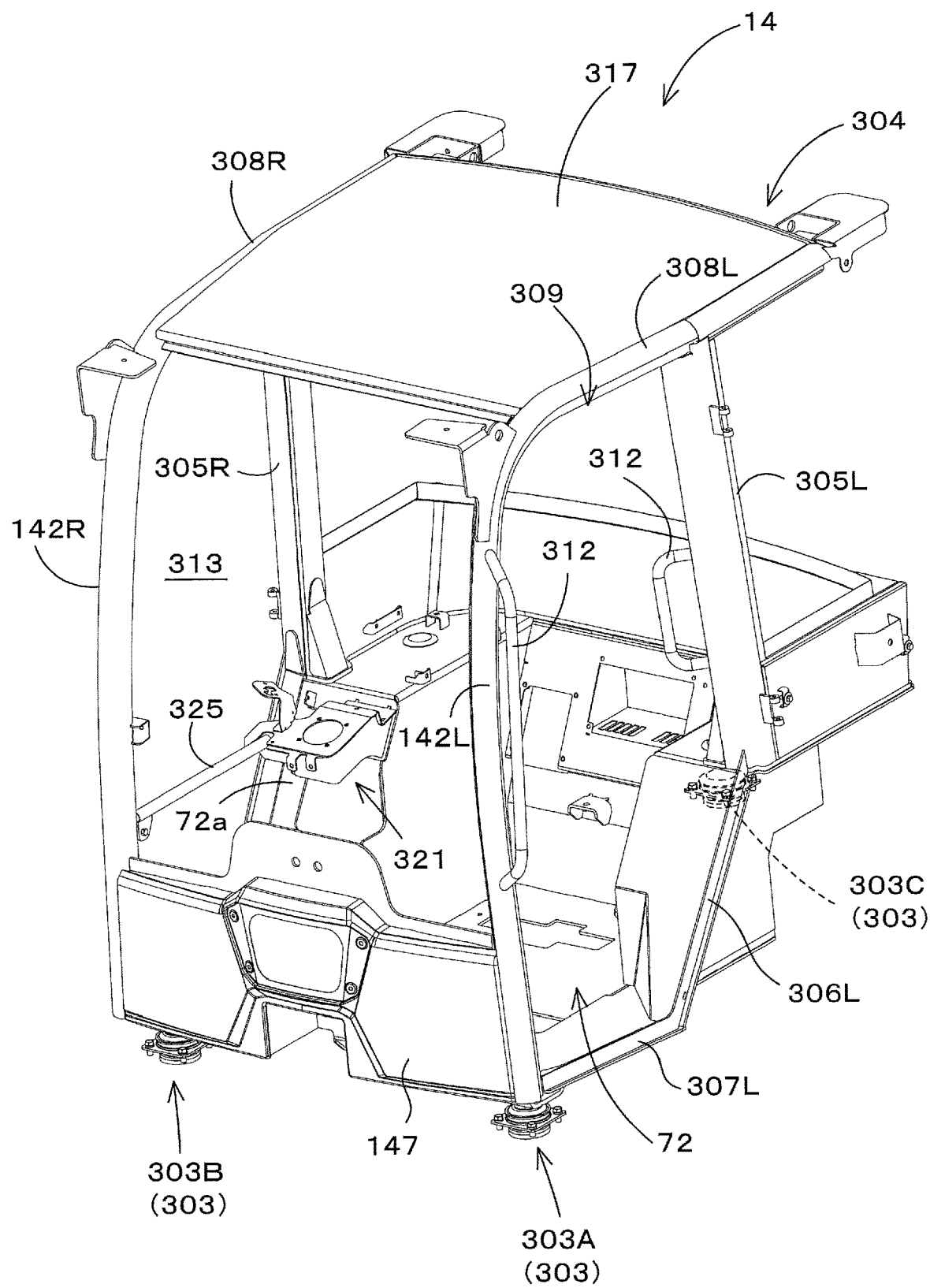
FIG. 4 is a perspective view of a cabin frame.

As shown in FIG. 4, the cabin 14 has a cabin frame 304 that constitutes a framework. The cabin frame 304 has a plurality of front struts (first front strut 142L, second front strut 142R) and a plurality of rear struts (first rear strut 305L, second rear strut 305R).

As shown in FIG. 4, the first front strut 142L is provided at a left side portion of a front portion of the cabin 14. In detail, the first front strut 142L is disposed forwardly leftward (on one side portion) of the operator's seat 13 (see FIG. 5A). The second front strut 142R is provided at a right side portion of the front portion of the cabin 14. In detail, the second front strut 142R is disposed forwardly rightward (on the other side portion) of the operator's seat 13 (see FIG. 5A). The first rear strut 305L is provided rearward of the first front strut 142L. In detail, the first rear strut 305L is disposed on an intermediate portion, in the machine fore-and-aft direction K1, of a left side surface of the cabin 14. The second rear strut 305R is provided rearward of the second front strut 142R. In detail, the second rear strut 305R is disposed on an intermediate portion, in the machine fore-and-aft direction K1, of a right side surface of the cabin 14.

As shown in FIG. 4, a lower end of the first rear strut 305L is formed to be higher than the lower end of the first front strut 142L. The first rear strut 305L is connected to the first front strut 142L by a first inclining frame 306L and a first connecting frame 307L. The first inclining frame 306L extends downwardly forward from the lower end of the first rear strut 305L. The first connecting frame 307L extends forward from the lower end of the first inclining frame 306L and is connected to the lower end of the first front strut 142L.

Figure 5A:
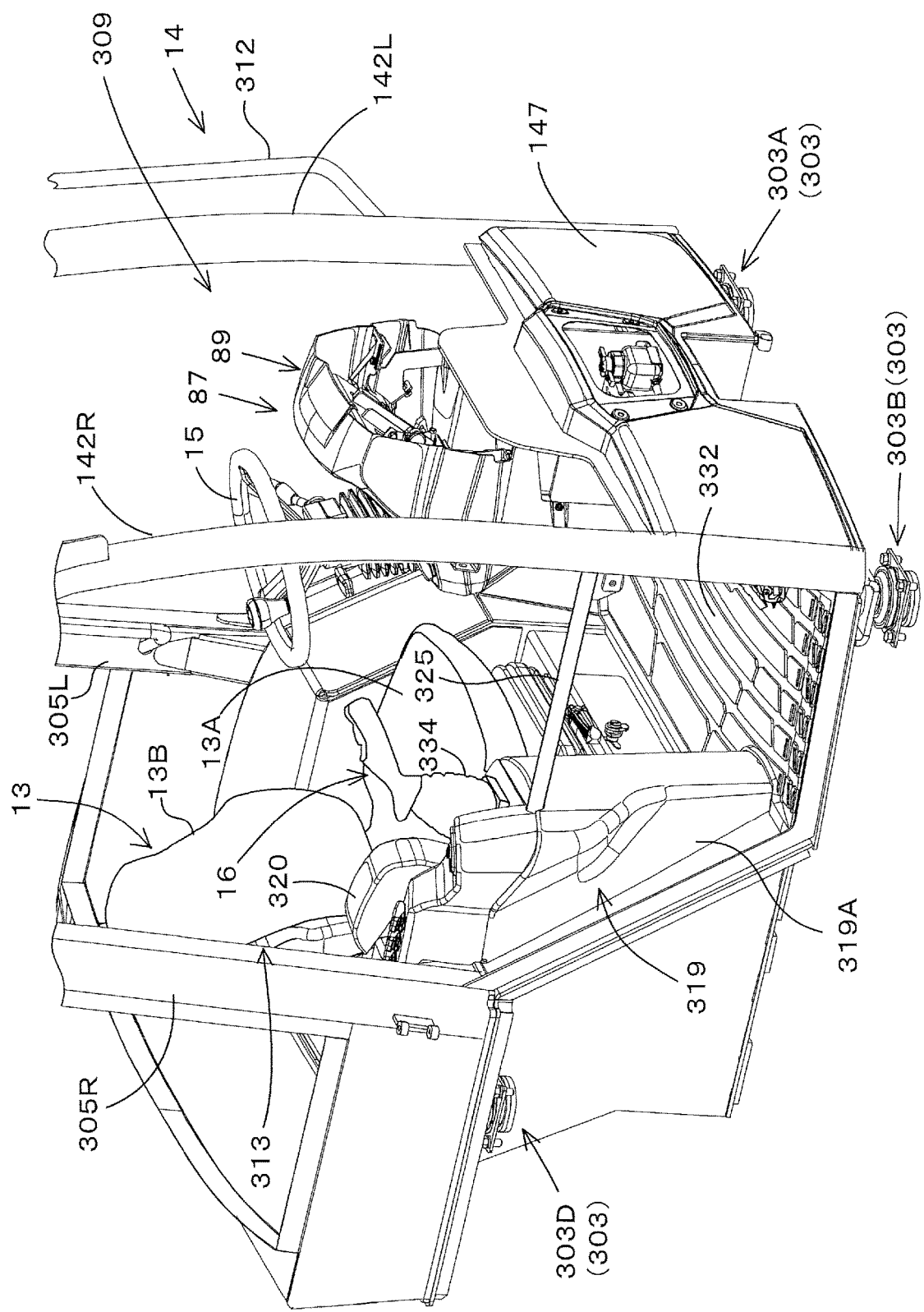
FIG. 5A is a perspective view of a front portion of a cabin.
Figure 5B:
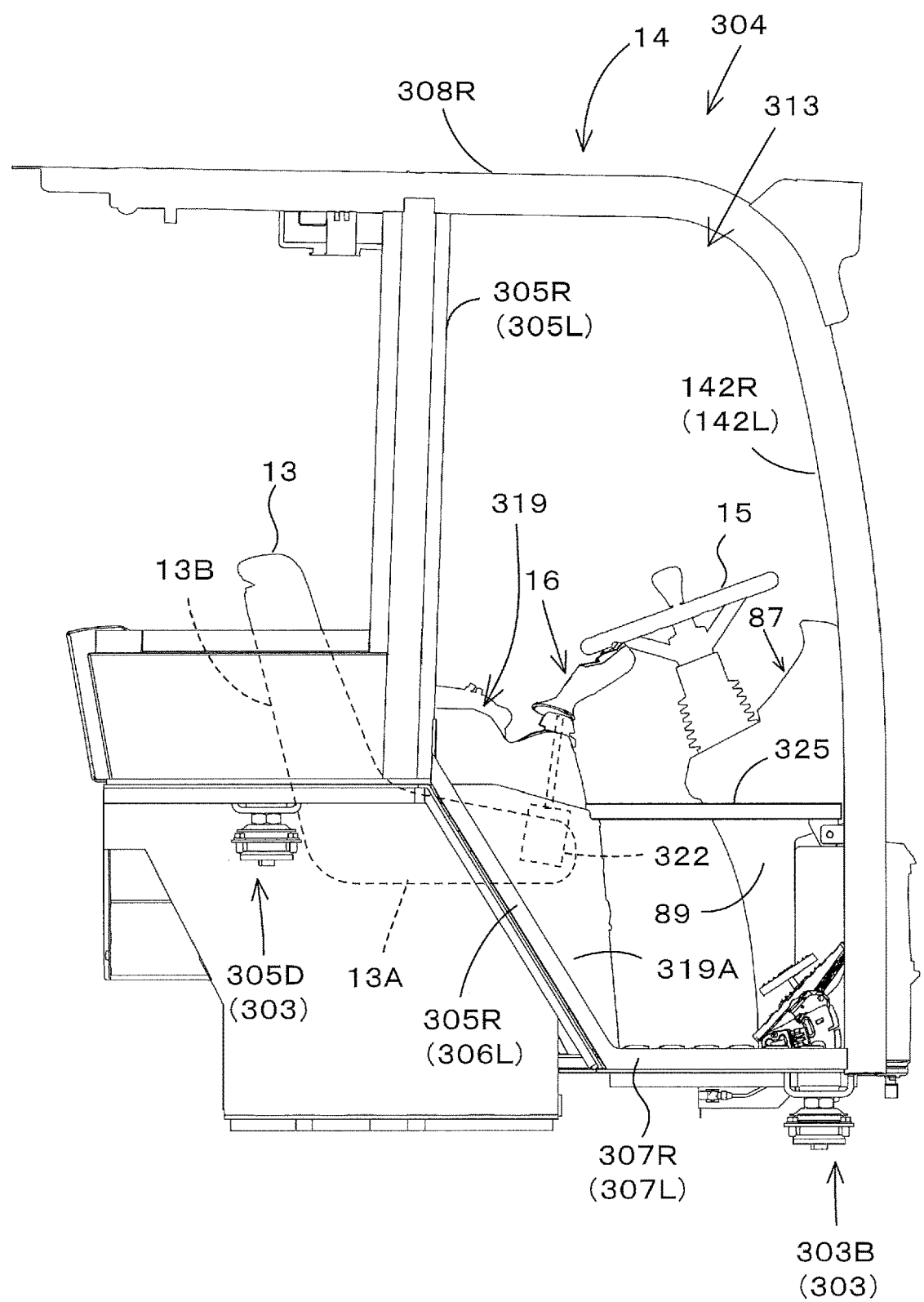
FIG. 5B is a right side view of the cabin.

As shown in FIG. 5B, the lower end of the second rear strut 305R is formed to be higher than the lower end of the second front strut 142R. The second rear strut 305R is connected to the second front strut 142R by a second inclining frame 306R and a second connecting frame 307R. The second inclining frame 306R extends downwardly forward from the lower end of the second rear strut 305R. The second connecting frame 307R extends forward from the lower end of the second inclining frame 306R and is connected to the lower end of the second front strut 142R.

As shown in FIG. 4, the cabin frame 304 includes a first upper frame 308L extending rearward from an upper end of the first front strut 142L. The first upper frame 308L is connected to the upper end of the first rear support strut 305L and extends rearward of the first rear support strut 305L.

As shown in FIG. 5B, the cabin frame 304 includes a second upper frame 308R extending rearward from an upper end of the second front strut 142R. The second upper frame 308R is connected to the upper end of the second rear strut 305R and extends rearward of the second rear strut 305R.

As shown in FIG. 4, an opening defined by the first front strut 142L, the first rear strut 305L, the first inclining frame 306L, the first connecting frame 307L, and the first upper frame 308L serves as an entrance gate (entrance passage) 309 through which the operator boards the cabin 14 and alights therefrom. That is, the entrance passage is provided on the left side portion (one side portion) of the operator's seat 13. Accordingly, the first front strut 142L defines a front portion of the entrance gate 309, and the first rear strut 305L defines a rear portion of the entrance gate 309.

As shown in FIG. 1, the entrance gate 309 is openably closed by an entrance door (first door) 172. In detail, the entrance door 172 is provided between the first front strut 142L and the first rear strut 305L, and is supported on the first rear strut 305L turnably around a vertical axis by a hinge member. On a left side surface of the cabin 14, an entrance step 311 and handrails 312 are provided to assist the operator in boarding on and alighting from the cabin 14. The entrance step 311 is provided downward of the entrance door 172. As shown in FIG. 4, the handrails 312 are provided on the first front strut 142L and the first rear strut 305L. The entrance door 172 includes a panel 172A having light transmission properties. For example, the panel 172A is formed of a transparent glass plate. The panel 172A is formed in size and shape such as to cover the entrance gate 309. The entrance door 172 has a frame member (not shown in the drawings) provided inward of the panel 172A and formed of a rod-like member such as a pipe member.

As shown in FIG. 5B, the cabin 14 includes, on the right side surface, an opening (open portion) 313 defined by the second front strut 142R, the second rear strut 305R, the second inclining frame 306R, the second connecting frame 307R, and the second upper frame 308R. As shown in FIG. 3, this opening 313 is openably closed by a door (second door) 314. In detail, the door 314 is provided between the second front strut 142R and the second rear strut 305R, and is supported on the second rear strut 305R turnably around the vertical axis by a hinge member 315. Accordingly, when the door 314 is opened from a state where the opening 313 is closed, a space above the floor part 75 and forward of the operator's seat 13 is opened to the outside of the machine body 2 through the opening 313. The door 314 includes a panel 314A having light transmission properties. For example, the panel 314A is formed of a transparent glass plate. The panel 314A is formed in size and shape such as to cover the opening 313. In addition, the door 314 has a frame member 316 provided inward of the panel 314A and formed of a rod-like member such as a pipe member (see FIG. 7B).

By opening the door 314, it is possible to put things in and out of the cabin interior and to clean the cabin interior from the side opposite to the entrance gate 309. In this embodiment, a lower end of the opening 313 is at the same height with or lower height than an upper surface of the floor part 75 (see FIG. 8A) or an upper surface of a rubber mat 332 laid on the floor part 75. This makes it possible to easily sweep out dusts and other debris on the floor part 75 or on the rubber mat 332. In addition, since the door 314 is mainly formed of the panel 314A having light transmission properties, a rightward visibility from the cabin 14 can be improved.

As shown in FIG. 3, a front panel 141 is provided between an upper portion of the first front strut 142L and an upper portion of the second front strut 142R, and cover panels 147 are provided between a lower portion of the first front strut 142L and a lower portion of the second front strut 142R. The front panel 141 is formed of a transparent glass plate or the like and has light transmission properties. The cover panels 147 are formed of non-transparent members. A roof 317 is provided between the first upper frame 308L and the second upper frame 308R. Rear panels 318 formed of transparent glass plates or the like having light transmission properties are provided on rear portions of the cabin frame 304. The rear panels cover the rear portions of side surfaces of the cabin frame 304 and a back surface of the cabin frame 304.

As shown in FIG. 5B, the operator's seat 13 has a seat portion 13A and a backrest portion 13B. The seat portion 13A is a portion on which an operator sits (places the buttock and thighs). The backrest portion 13B is a portion on which the sitting operator leans his or her back, and is extended upward from a rear portion of the seat portion 13A.

Figure 7A:
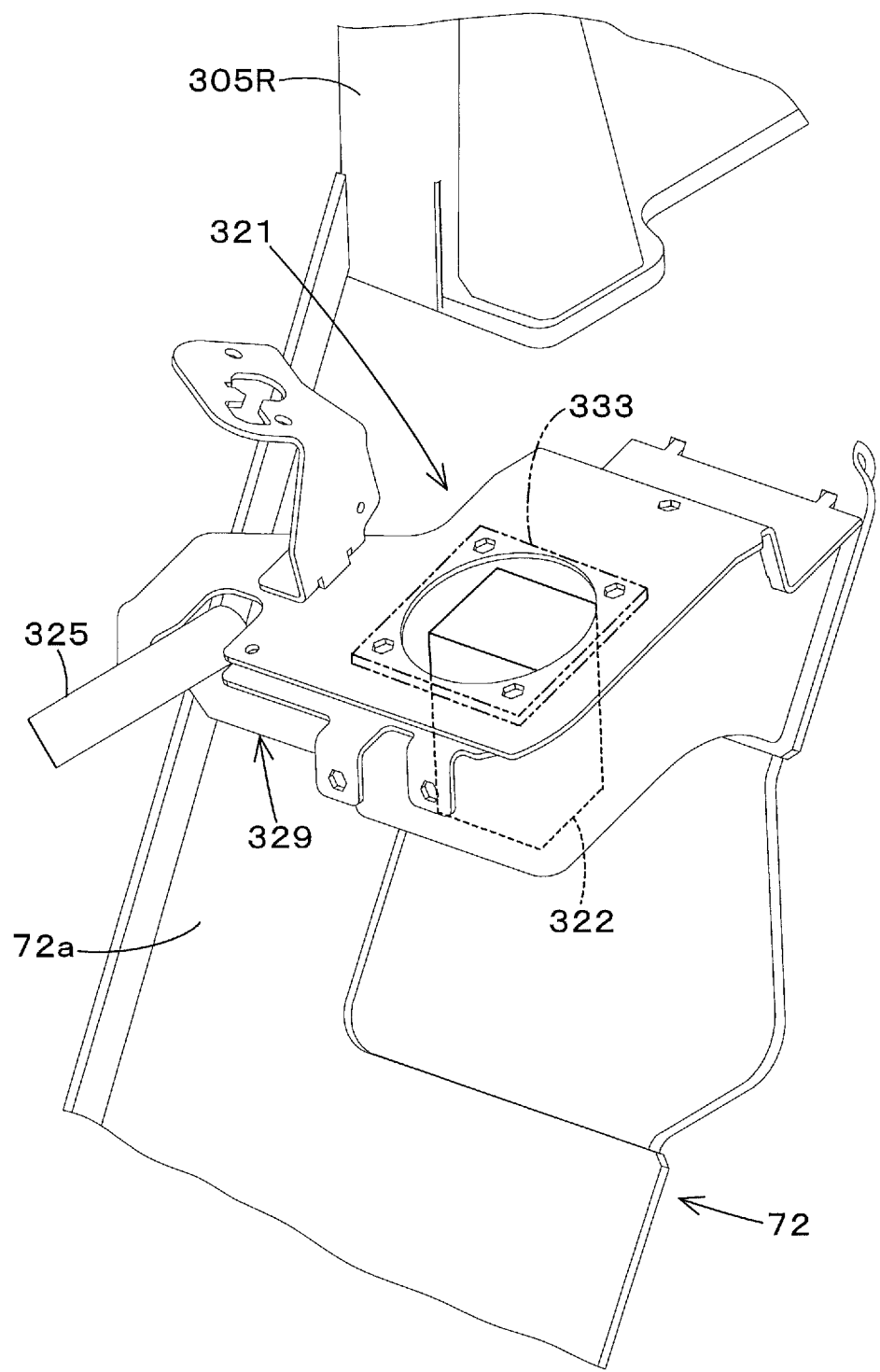
FIG. 7A is a perspective view of a rear attaching portion of the blocking member.
Figure 7B:
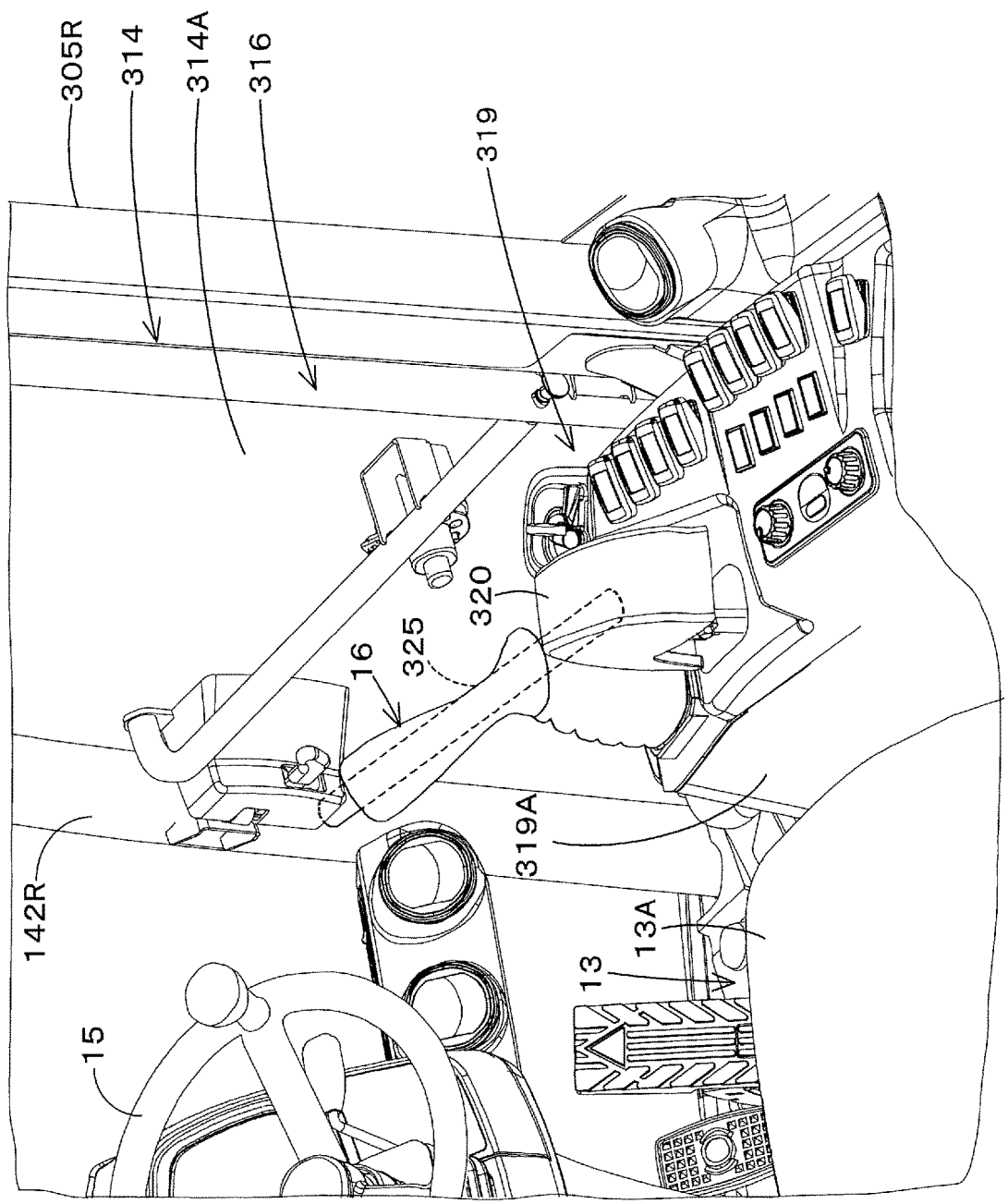
FIG. 7B is a perspective view of the blocking member seen from an operator's seat side.

As shown in FIGS. 5B and 7B, an operation console 319 is provided on the right side portion (the other side portion) of the operator's seat 13. The manipulation lever 16 is provided, inwardly in the machine width direction, on a front portion of the operation console 319. An armrest 320 is provided on the operation console 319. The armrest 320 is disposed rearward of the manipulation lever 16. The armrest 320 is disposed on a side portion rightward of the operator's seat 13.

The operation console 319 has a console box 319A. The console box 319A is attached to the cabin frame 304. Various types of switches are centrally arranged, on an upper surface of the console box 319A, on lateral portions of and a rear portion of the armrest 320. As shown in FIG. 4, the operation console 319 includes a supporting bracket 321. As shown in FIG. 4 and FIG. 7A, the supporting bracket 321 is fixed to an inclining wall 72a of the floor frame 72. The floor frame 72 will be described later. The supporting bracket 321 is provided inside the front portion of the console box 319A. The front portion of the console box 319A is attached to and supported by the supporting bracket 321.

The manipulation lever 16 is supported by the supporting bracket 321. In detail, a remote control valve 322 is attached to the supporting bracket 321 (see FIG. 7A), and the manipulation lever 16 is attached to the remote control valve 322 via an interlocking member or the like (see FIG. 5B). That is, the manipulation lever 16 is supported by the supporting bracket 321 via the remote control valve 322. The remote control valve 322 is a pilot-operated valve configured to pilot a control valve that controls the lift cylinders 11L and 11R and a control valve that controls the working tool cylinder 12. As shown in FIG. 7A, the remote control valve 322 is disposed on a lower side portion of the supporting bracket 321 and is fixed to a mounting plate 333 attached to the supporting bracket 321. The remote control valve 322 with the supporting bracket 321 is covered by the console box 319A. The manipulation lever 16 protrudes from the console box 319A, and its base portion is covered by a boot member 334 (see FIG. 5A).

As shown in FIGS. 4, 5A, and 5B, the working machine 1 (cabin 14) includes a blocking member 325 that prevents an operator from boarding on and alighting from the cabin through the opening 313 provided on the side portion rightward of the operator's seat. That is, in the present embodiment, the opening 313 is not used as an entrance gate (entrance passage) for the operator to board on and alight from the cabin. For this reason, in this embodiment, no entrance step or handrail is provided on the right side portion of the cabin 14. The blocking member 325 is formed of a rod-like member such as a pipe material and is extended between the operation console 319 and the second front strut 142R. This enables an operator to recognize that the opening 313 is not an entrance passage, and also inhibits the operator from boarding on and alighting from the cabin through the right side portion of the cabin 14 (a portion opposite to the entrance passage) because the blocking member 325 interferes with the boarding and alighting.

As shown in FIG. 5B, the blocking member 325 is extended in the machine fore-and-aft direction K1 (in the horizontal direction) and is disposed below an upper end of the manipulation lever 16 and above the bottom surface of the seat portion 13A. This allows the blocking member 325 to be disposed at a position where the blocking member 325 does not interfere with a sight of an operator seated on the operator's seat 13 while preventing the operator from boarding on and alighting from the cabin through the portion opposite to the entrance gate 309.

As shown in FIG. 7B, the blocking member 325 is disposed at a position overlapping the manipulation lever 16 in a sight direction of the operator seated on the operator's seat 13. That is, when the operator is seated on the operator's seat 13 and looks at the blocking member 325, a part or all of the blocking member 325 is hidden by the manipulation lever 16. This prevents the blocking member 325 from interfering with the operator's sight.

Figure 6:
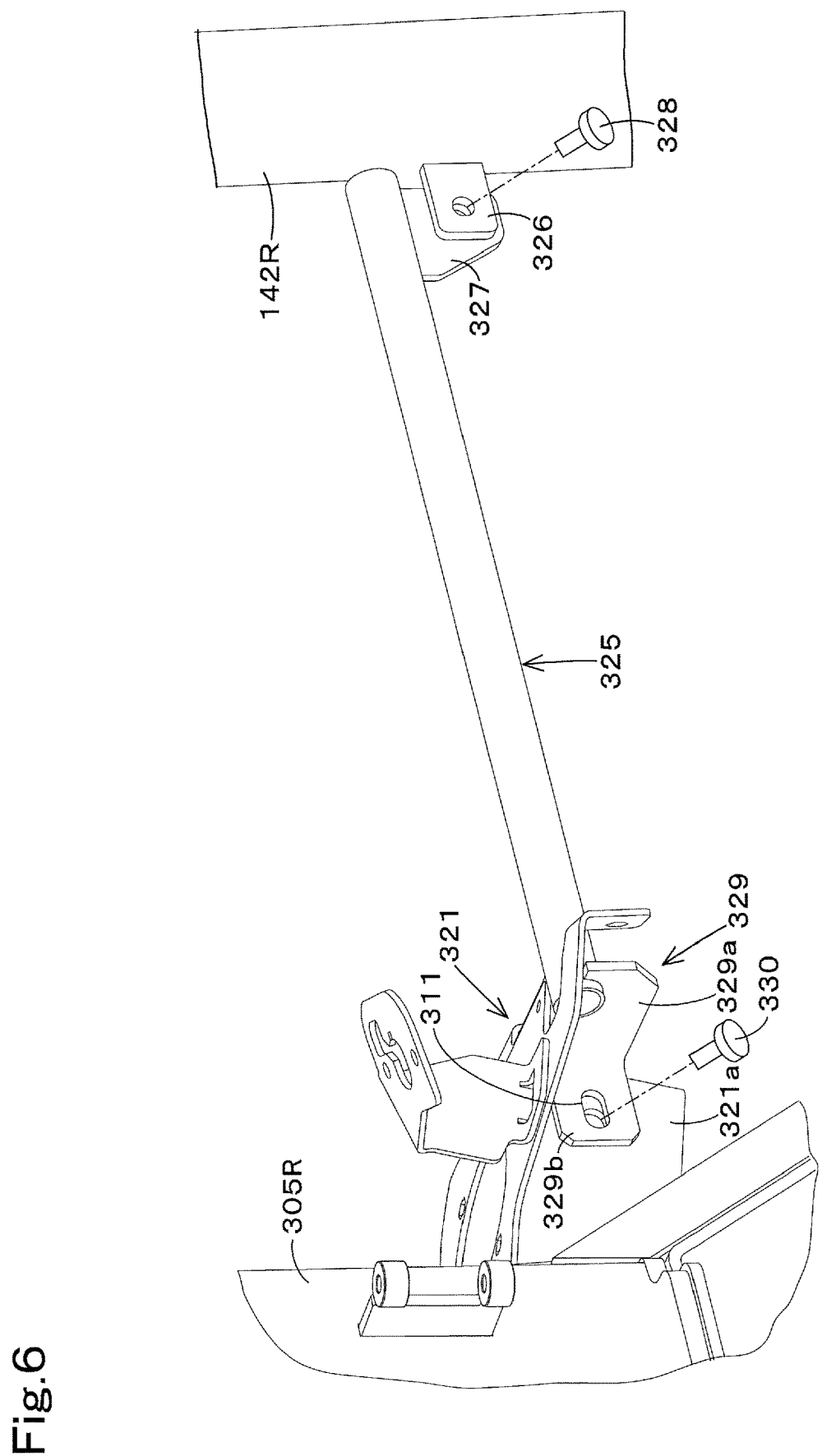
FIG. 6 is a perspective view of an attaching portion of a blocking member.

As shown in FIG. 6, a front portion of the blocking member 325 is attached to the second front strut 142R, and a rear portion of the blocking member 325 is attached to the supporting bracket 321. In detail, an attachment tab 326 is fixed to the second front strut 142R, and an attachment stay (referred to as the first attachment stay) 327 is fixed to the front portion of the blocking member 325. A bolt 328 penetrates the attachment tab 326 and the first attachment stay 327 from the outer side of the machine body, and the bolt 328 is screwed into a nut fixed on an inner surface of the first attachment stay 327 in the machine inward direction. In this manner, the front portion of the blocking member 325 is attached to the second front strut 142R. In addition, an attachment stay (referred to as a second attachment stay) 329 is fixed to the rear portion of the blocking member 325. The attachment stay 329 includes a first portion 329a whose plate surface faces the machine fore-and-aft direction K1, and a second portion 329b extending rearward from an inner end of the first portion 329a in the machine inward direction. The blocking member 325 is fixed to an upper portion of the first portion 329a. A bolt 330 penetrates the second portion 329b and an outer side wall 321a of the supporting bracket 321 from the outer side in the machine outward direction, and the bolt 330 is screwed into a nut fixed on an inner surface of the side wall 321a in the machine inward direction. In this manner, the rear portion of the blocking member 325 is attached to the supporting bracket 321.

When the bolts 328 and 330 are removed, the blocking member 325 also can be removed. However, the rear portion of the blocking member 325 and the second attachment stay 329 are housed together with the supporting bracket 321 in the console box 319A, so that the blocking member 325 and the second attachment stay 329 cannot be easily removed from the console box 319A.

As shown in FIG. 6, the second portion 329b has a bolt insertion hole 331 through which a bolt 330 is inserted. The bolt insertion hole 331 is formed into a long hole that is long in the machine fore-and-aft direction K1. This makes it possible to cancel an attachment error (manufacturing error) in attachment of the blocking member 325.

The present embodiment describes a case where the blocking member 325 is applied to the working machine 1 including the cabin 14, but the embodiment is not limited thereto. For example, the blocking member 325 also can be applied to the working machine 1 including a canopy having an opening portion behind the front struts. The opening portion opens the space therein above the floor part 75 disposed forward of the operator's seat 13 to the outside of the machine body 2.

As shown in FIG. 4, the working machine 1 has the floor frame 72 mounted on the machine body frame 71 (machine body 2). The floor frame 72 is fixed to the lower portion of the cabin frame 304. That is, the floor frame 72 defines a lower portion of the cabin 14. Accordingly, the floor frame 72 is supported together with the cabin 14 by the machine body frame 71 via the mounting member 303 in an anti-vibration manner.

Figure 8A:
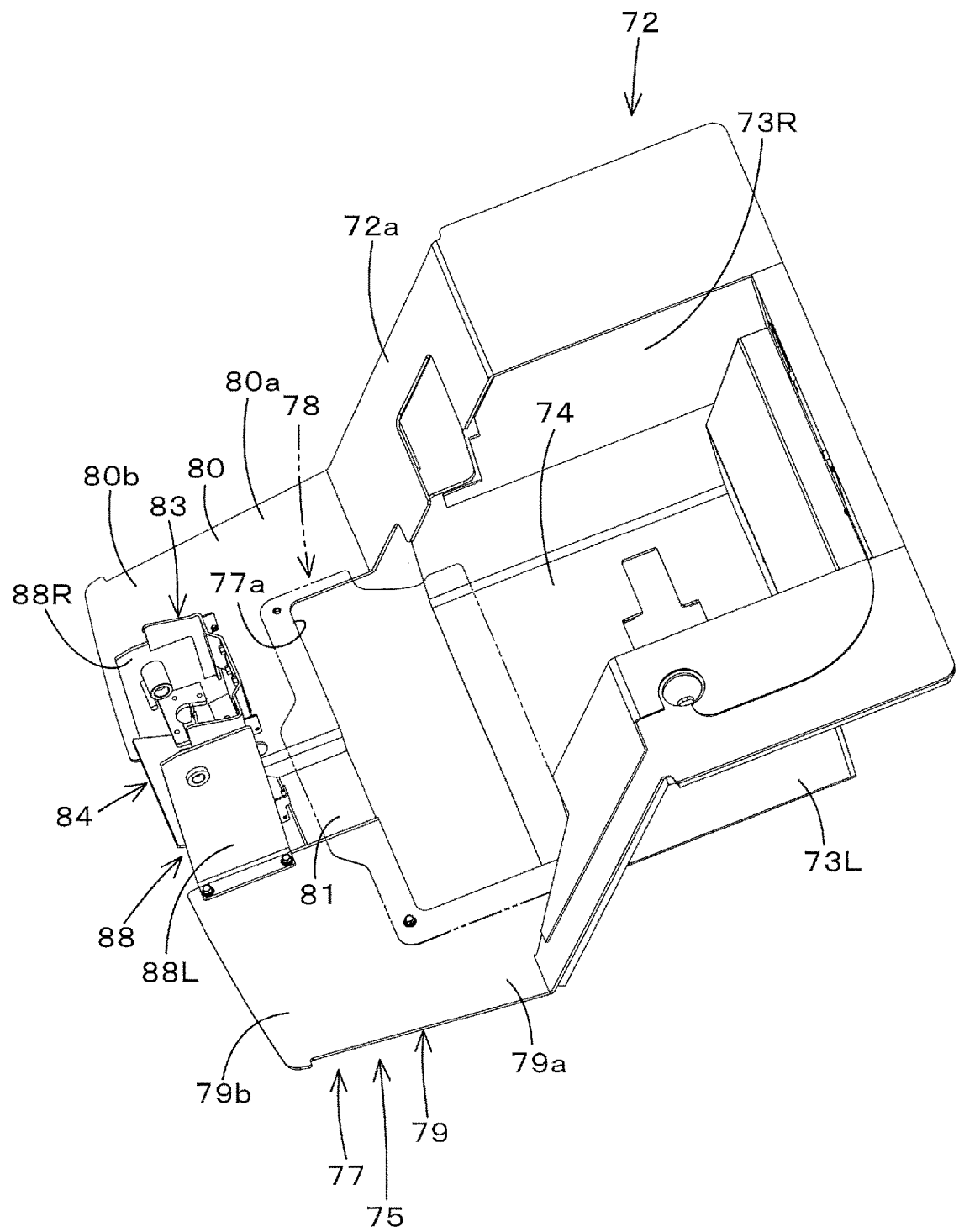
FIG. 8A is a perspective view of a floor frame seen from an upper portion of a back side.
Figure 8B:
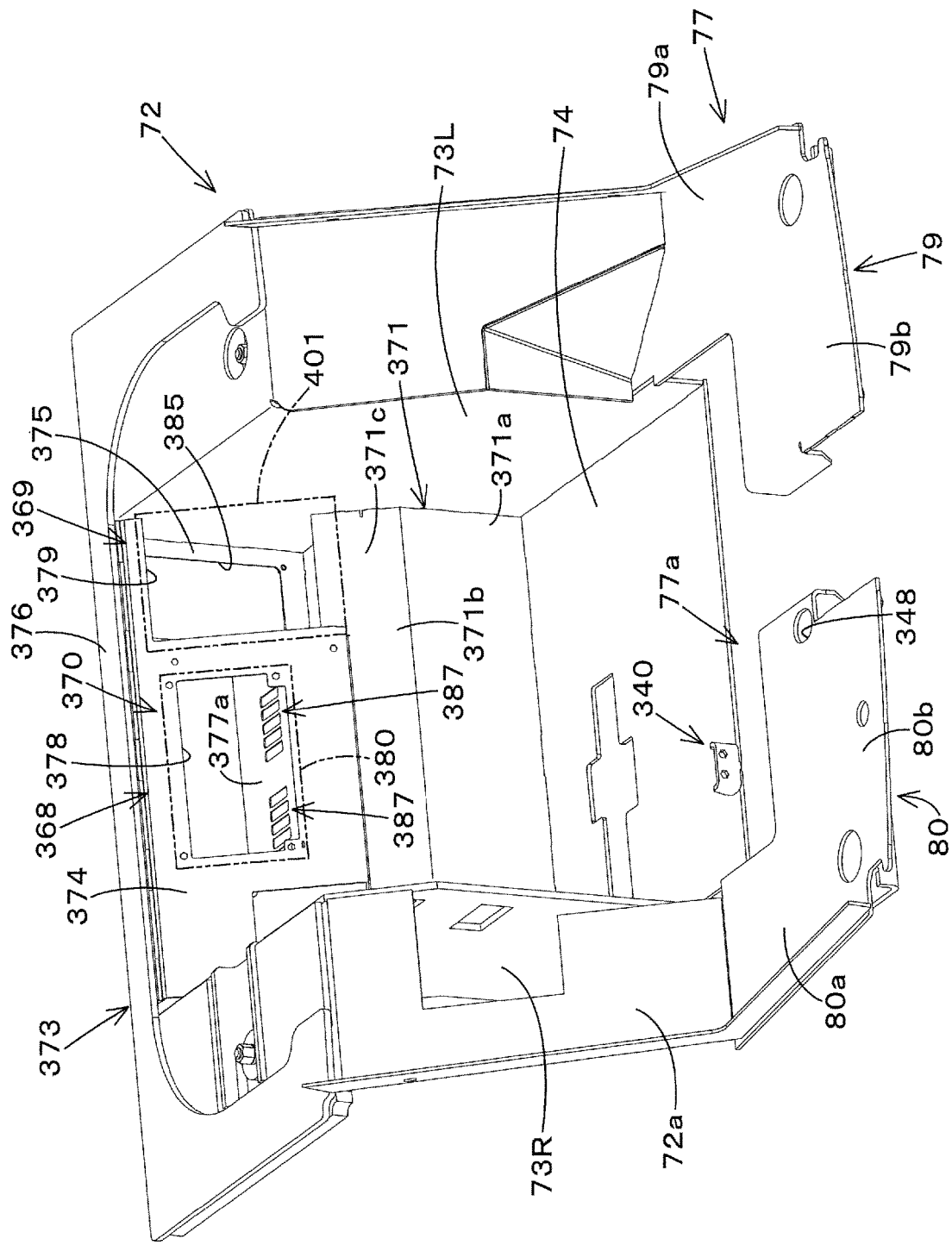
FIG. 8B is a perspective view of the floor frame seen from a front side.

As shown in FIGS. 8A and 8B, the floor frame 72 includes a first side wall 73L on the left side thereof and a second side wall 73R on the right side thereof. A bottom wall (installation part) 74 is provided between lower portions of the first and second side walls 73L and 73R. The floor frame 72 includes a floor part (step) 75 provided forward of the bottom wall 74. The bottom wall 74 is located downward of the floor part 75. Accordingly, there is a gap between the front end portion of the bottom wall 74 and the rear end portion of the floor part 75. The rubber mat 332 is laid on the floor part 75 (see FIG. 5A).

As shown in FIG. 8A, the floor part 75 includes a floor main body 77 having an inspection opening 77a and an openable cover 78 configured to close the inspection opening 77a. The openable cover 78 is detachably attached to the floor main body 77 by bolts or the like. The floor main body 77 includes a first part 79, a second part 80 and a third portion 81.

As shown in FIGS. 8A and 8B, the first part 79 defines a left portion of the floor main body 77. The rear portion 79a of the first part 79 has a width in the machine width direction K2 that is smaller than that of a front portion 79b of the first part 79. In detail, the rear portion 79a is positioned outward in the machine width direction (leftward) from the first side wall 73L, and the front portion 79b includes a rearward portion extending forward from the rear portion 79a and a forward portion extending inward (rightward) in the machine width direction from the rearward portion and from the rear portion 79a.

The second part 80 defines a right portion of the floor main body 77. A rear portion 80a of the second part 80 has a width in the machine width direction K2 that is smaller than that of a front portion 80b of the first part 79. In detail, the rear portion 80a is positioned outward in the machine width direction (rightward) from the second side wall 73R, and the front portion 80b includes a rearward portion extending forward from the rear portion 80a and a forward portion extending inward (leftward) in the machine width direction from the rearward portion and from the rear portion 80a.

The floor frame 72 includes an inclining wall 72a extending upwardly backward from a rear end of the rear portion 80a. The supporting bracket 321 is fixed to this inclining wall 72a (see FIG. 7A).

The third part 81 is positioned at the center portion in the machine width direction K2 and is also positioned between the front portion 79b of the first part 79 and the front portion 80b of the second part 80. The third part 81 connects the front portion 79b to the front portion 80b. In detail, the third part 81 connects the rear side portion of the front portion 79b to the rear side portion of the front portion 80b. The third part 81 is formed to have a recess portion that is recessed downward.

The rear portion 79a of the first part 79 and the rear portion 80a of the second part 80 define an opening which is the inspection opening 77a. When the rubber mat 332 and the openable cover 78 are removed, the equipment and the like installed in the machine body frame 71 can be inspected through the inspection opening 77a.

As shown in FIG. 5A, a steering column 87 supporting the steering wheel 15 is provided in the front portion of the cabin interior. The steering column 87 is positioned at the center portion of the cabin interior in the machine width direction K2.

As shown in FIG. 8A, the steering column 87 has a column frame (frame member) 88 erected on the front portion of the floor frame 72. As shown in FIG. 5A, the steering column 87 includes a column cover 89 that covers the column frame 88.

As shown in FIG. 8A, the column frame 88 is provided to the center portion, in the machine width direction K2, of the front portion of the floor frame 72. The column frame 88 is positioned forward of the third part 81. The column frame 88 includes a first side wall 88L and a second side wall 88R spaced apart from each other in the machine width direction K2. The first side wall 88L defines the left portion of the column frame 88 and is erected on the floor part 75. The second side wall 88R defines the right portion of the column frame 88 and is erected on the floor part 75.

As shown in FIG. 9, the column frame 88 includes a first connecting member 83 and a second connecting member 84. The first connecting member 83 connects an upper rear portion of the first side wall 88L to an upper rear portion of the second side wall 88R. The second connecting member 84 connects a lower portion of the first side wall 88L to a lower portion of the second side wall 88R. A steering valve 90 configured to control the steering cylinder 6 is attached to a lower side portion of the second connecting member 84.

As shown in FIG. 5A, the front side portion of the steering column 87 is opened. As shown in FIG. 3, the front side portion of the steering column 87 is covered by the front panel 141 and the cover panels 147.

Figure 9A:
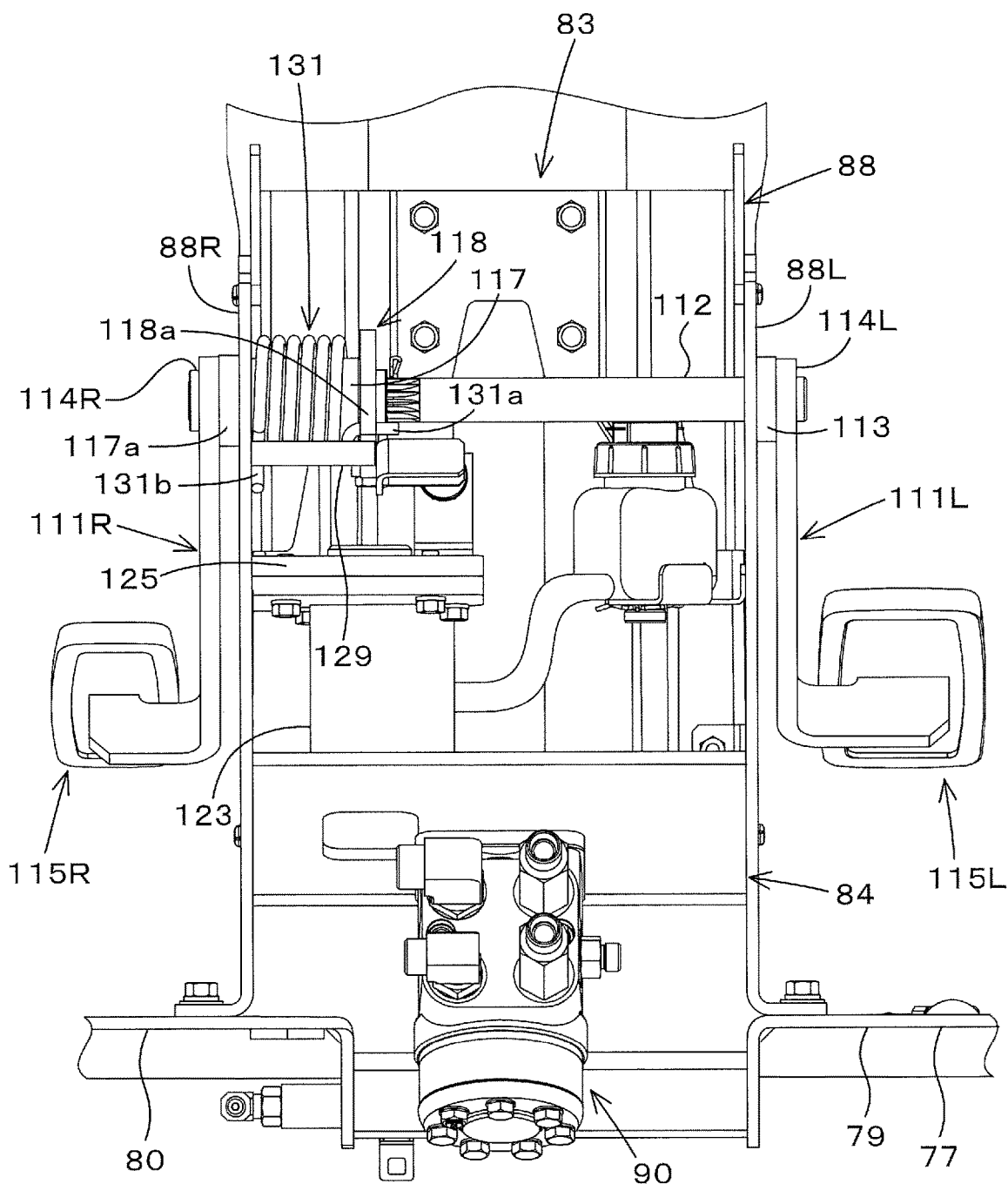
FIG. 9A is a front view of a supporting structure of a brake pedal.
Figure 9B:
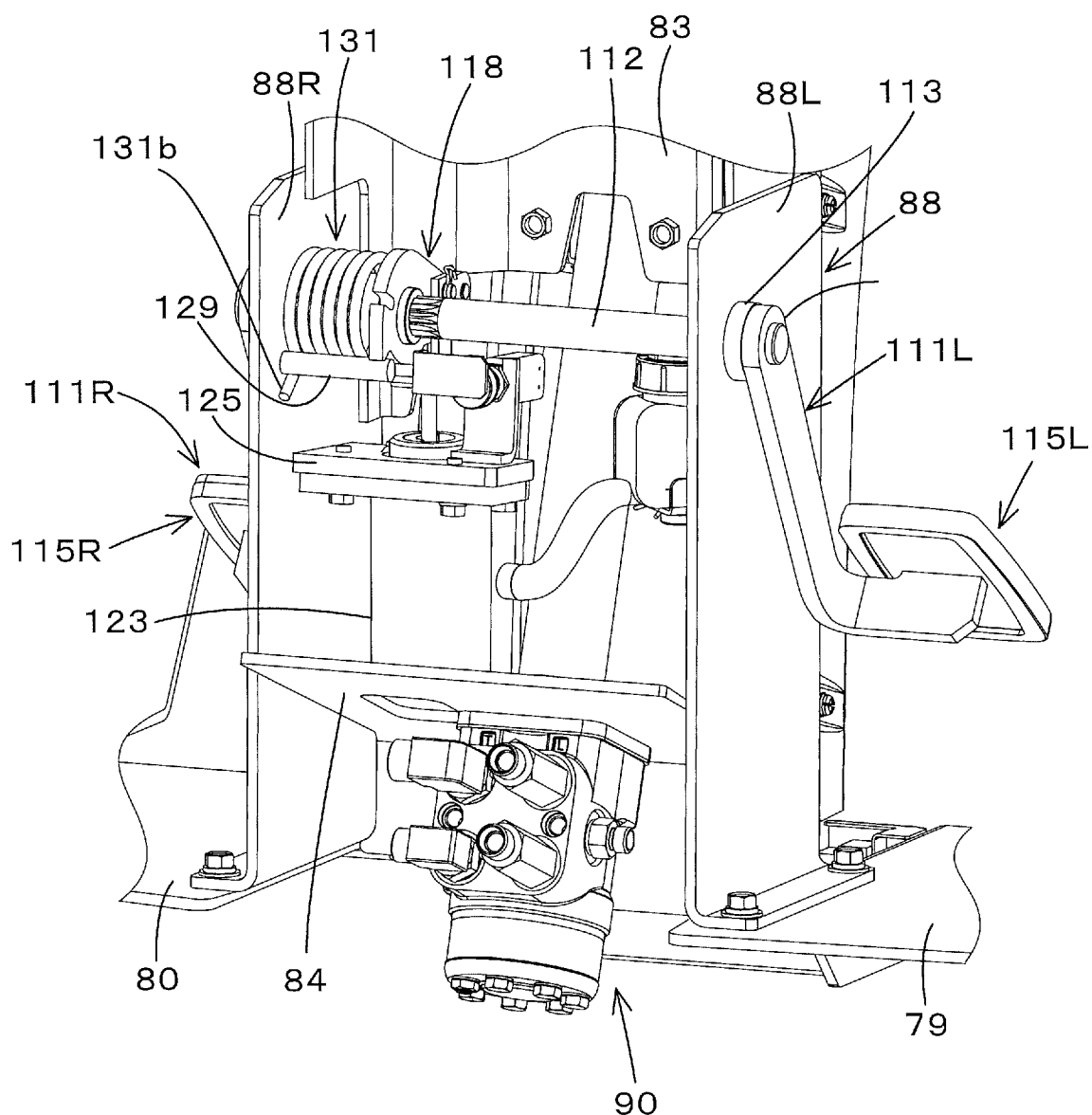
FIG. 9B is a perspective view of the supporting structure of the brake pedal.

As shown in FIGS. 9A and 9B, a brake pedal (referred to as a first brake pedal) 111L is disposed leftward of the column frame 88. A brake pedal (referred to as a second brake pedal) 111R other than the first brake pedal 111L is disposed rightward of the column frame 88. A brake shaft 112 having an axial center extending in the machine width direction K2 is provided on an upper portion of the column frame 88. The brake shaft 112 is formed of a single rod, penetrates upper and front portions of the first and second side walls 88L and 88R, and is supported by these side walls 88L and 88R rotatably around the axial center.

The left portion of the brake shaft 112 protrudes leftward from a bearing boss 113 fixed to the outer side of the first side wall 88L. An upper portion 114L of the first brake pedal 111L is fixed to this protruding portion. Accordingly, the first brake pedal 111L rotates integrally with the brake shaft 112. A lower portion of the first brake pedal 111L is provided with a pedaling portion 115L that is pressed by the operator. That is, the first brake pedal 111L is a suspended brake pedal.

Figure 10:
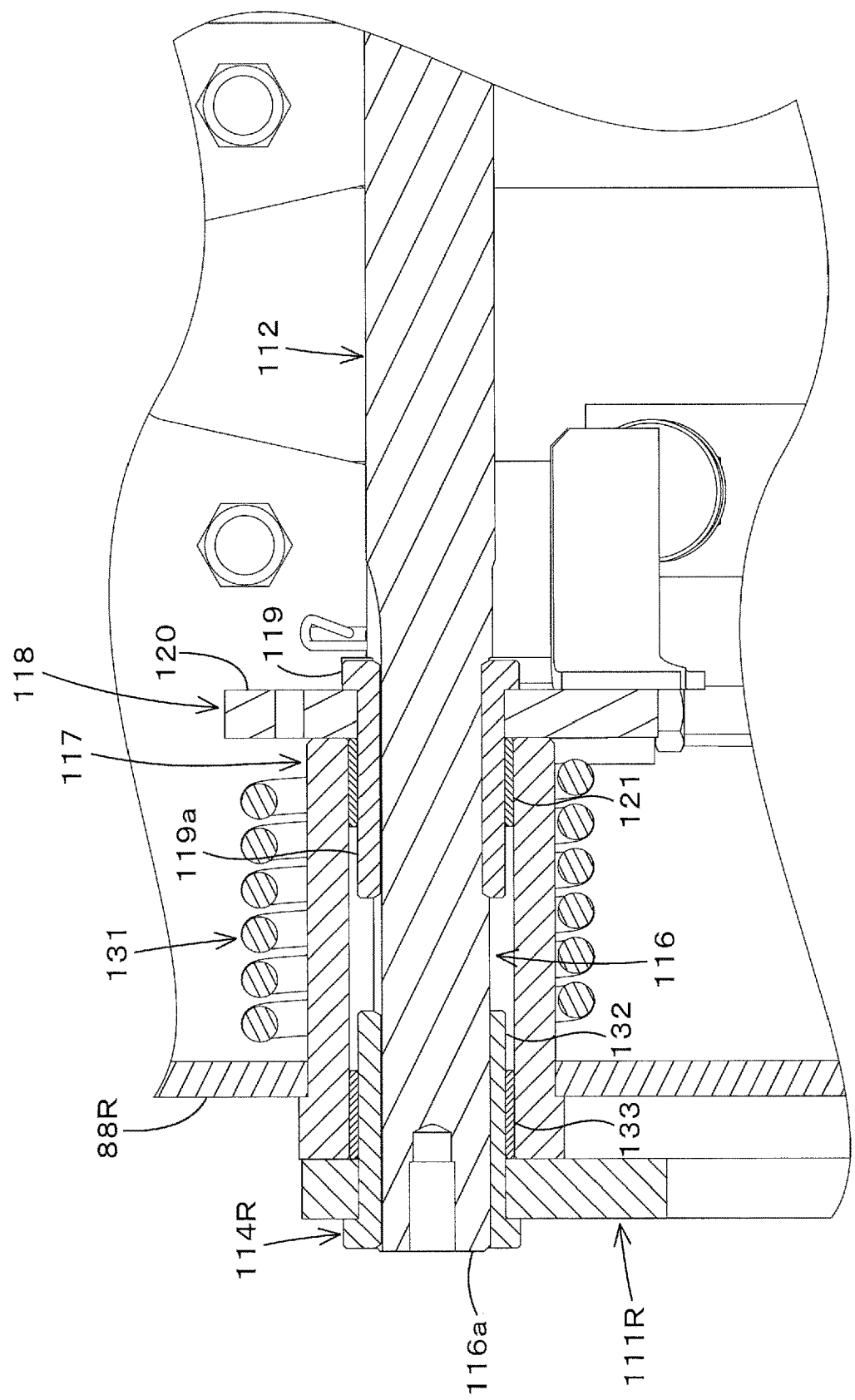
FIG. 10 is a cross section view of the supporting structure of the brake pedal.

As shown in FIG. 10, a right portion of the brake shaft 112 protrudes outward in the machine width direction from the second side wall 88R. A pedal boss 114R on an upper portion of the second brake pedal 111R is attached to the right portion of the brake shaft 112. Accordingly, the second brake pedal 111R also rotates integrally with the brake shaft 112. A lower portion of the second brake pedal 111R is also provided with a pedaling portion 115R that is pressed by the operator. That is, the second brake pedal 111R is also a suspended brake pedal.

As shown in FIG. 10, the brake shaft 112 includes, at the right portion thereof, a coupling portion 116 formed with a spline. The coupling portion 116 extends to the right end of the brake shaft 112. A bearing cylinder 117 supporting the brake shaft 112 is fixed to an inner upper portion of the second side wall 88R. The bearing cylinder 117 penetrates the second side wall 88R and protrudes inward in the machine width direction from the second side wall 88R. The bearing cylinder 117 is opened at both axial ends thereof, and the coupling portion 116 is inserted into the bearing cylinder 117. The coupling portion 116 protrudes from the left end of the bearing cylinder 117. A brake arm 118 is disposed leftward of the bearing cylinder 117. The brake arm 118 includes an arm boss 119 that is fitted to the coupling portion 116 and an arm portion 120 that is fixed to the arm boss 119. The arm boss 119 is spline-coupled to the coupling portion 116 so as to be rotatable integrally with the brake shaft 112. In addition, the arm boss 119 includes a bearing portion 119a that is inserted into the bearing cylinder 117. The brake shaft 112 is supported by the bearing cylinder 117 via the bearing portion 119a and a bushing 121.

As shown in FIG. 10, the coupling portion 116 includes a protruding portion 116a that protrudes from a right end portion of the bearing cylinder 117 in the machine outward direction (in a lateral direction opposite to the lateral side where the first brake pedal 111L is disposed). The pedal boss 114R is spine-fitted into the protruding portion 116a from the right side, thereby being rotatable integrally with the brake shaft 112. The pedal boss 114R includes a shaft supporting portion 132 that is inserted into the bearing cylinder 117. The outer circumference of the shaft supporting portion 132 is fitted with a bushing 133 provided on an inner circumference of the bearing cylinder 117. The brake shaft 112 is supported by the bearing cylinder 117 via the shaft supporting portion 132 and the bushing 133.

Figure 11:
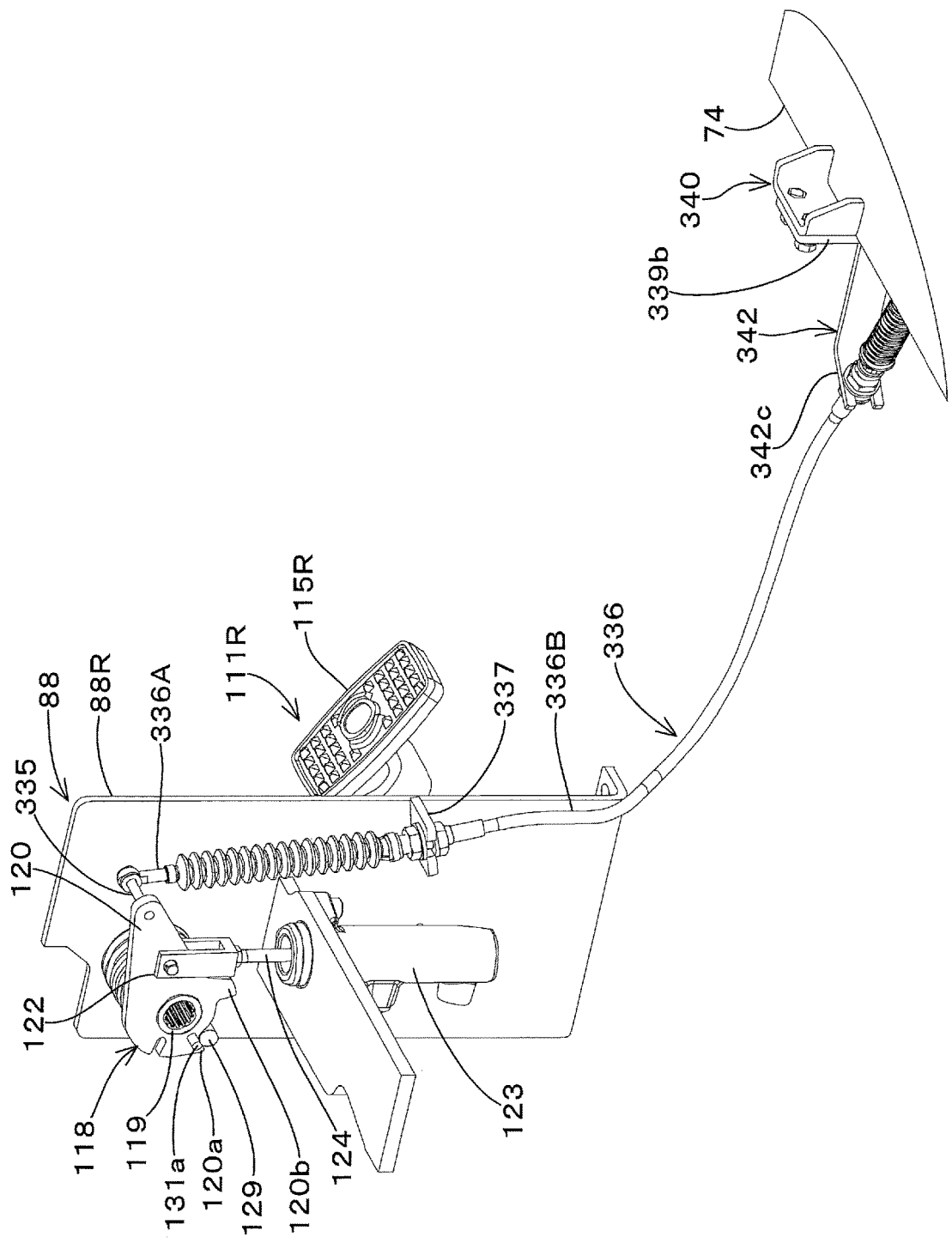
FIG. 11 is a perspective view showing a relationship between a brake arm and a cable.

As shown in FIG. 11, one end of a connecting linkage 122 is pivotally supported by a rear portion of the arm 120, and the other end of the connecting linkage 122 is connected to an upper portion of a piston rod 124 of a master cylinder 123. Accordingly, by depressing the first brake pedal 111L or the second brake pedal 111R, a rear portion of the brake arm 118 swings downward due to rotation of the brake shaft 112, and the piston rod 124 is pushed in via the connecting linkage 122. This activates the master cylinder 123 to operate the brake system that is not shown in the drawings.

As shown in FIG. 11, the arm portion 120 includes a first contacting portion 120a and a second contacting portion 120b. A restriction rod 129 is provided between the first contacting portion 120a and the second contacting portion 120b. As shown in FIGS. 9A and 9B, the restriction rod 129 is fixed to the second side wall 88R and protrudes in the machine inward direction. When the first contacting portion 120a touches the restriction rod 129, the first brake pedal 111L and the second brake pedal 111R are prevented from swinging further in the direction opposite to the depressing direction (anti-depressing direction). The positions of the brake pedals 111L and 111R when the first contacting portion 120a touches the restriction rod 129 are defined as positions of the pedals before depressing the pedals. When the second contacting portion 120b touches the restriction rod 129, the first brake pedal 111L and the second brake pedal 111R are prevented from swinging further in the depressing direction.

As shown in FIGS. 9A and 9B, a return spring 131 is disposed on a rightward portion between the first and second side walls 88L and 88R to return the brake pedals 111L and 111R to their initial positions before operations (set positions in no operation). The return spring 131 is a torsional coil spring surrounding the brake shaft 112. In this embodiment, the return spring 131 surrounds an outer circumference of the bearing cylinder 117. One end (left end portion) 131a of the return spring 131 is engaged with the brake arm 118 (see FIG. 11). The other end (right end portion) 131b of the return spring 131 is hooked on the restriction rod 129. In this manner, the return spring 131 biases the first brake pedal 111L and the second brake pedal 111R in the anti-depressing direction.

Figure 12:
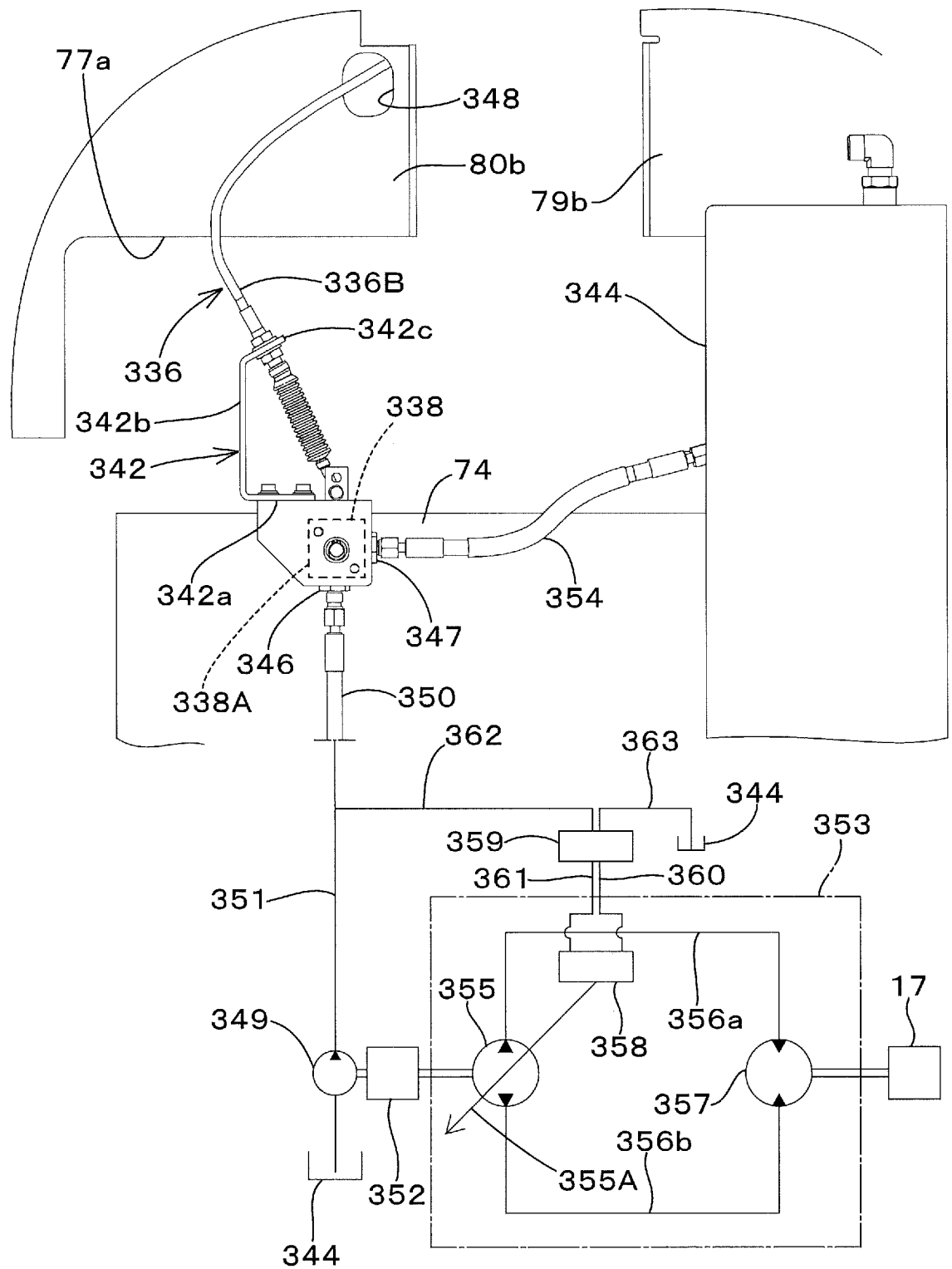
FIG. 12 is a structural view showing an attaching portion of an inching valve and a traveling hydraulic circuit.

As shown in FIG. 11, a connecting rod 335 is fixed to a tip portion of the arm portion 120 and protrudes in the machine outward direction. One end of the cable 336 is pivotally connected to one end portion (an end portion in the machine outward direction) of this connecting rod 335. In detail, the cable 336 includes an inner cable 336A and an outer cable 336B, and one end of the inner cable 336A is connected to the connecting rod 335. A first cable stay 337 is fixed to a machine-inward directional surface of the second side wall 88R. The first cable stay 337 is provided on a rear and lower portion of the second side wall 88R. One end portion of the cable 336 is attached to the first cable stay 337. In detail, the outer cable 336B is attached to the first cable stay 337. As shown in FIG. 12, the cable 336 is arranged below the floor frame 72 through the cable insertion hole 348 formed in the floor frame 72. As shown in FIG. 8B, the cable insertion hole 348 is formed in the front portion 80b of the second part 80 of the floor main body 77.

The cable 336 is a cable that interlocks the brake arm 118 (brake pedals 111L and 111R) to the inching valve (valve) 338 (see FIGS. 11 and 12).

Figure 13:
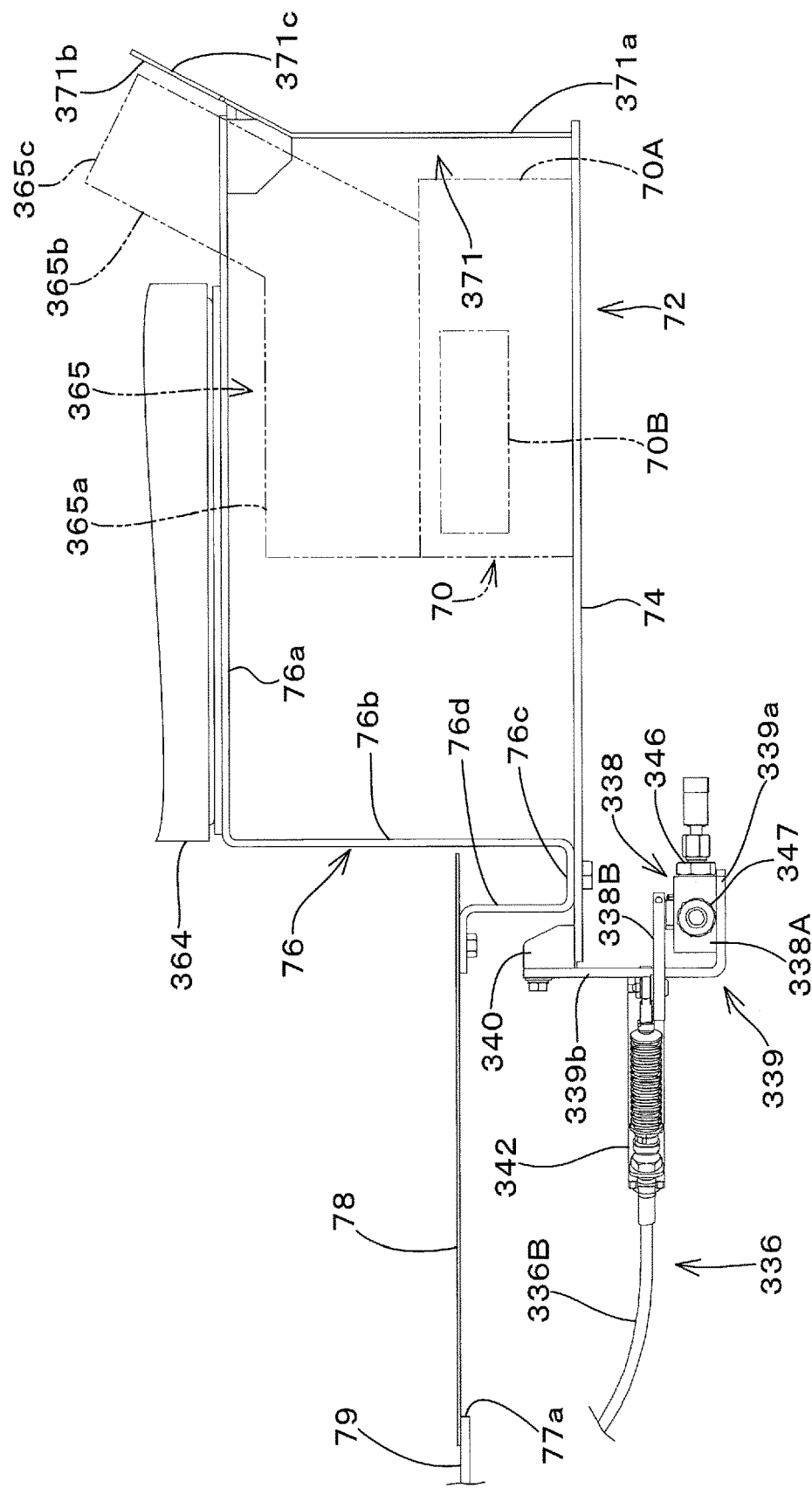
FIG. 13 is a side view of an attachment of the inching valve.

As shown in FIG. 13, the inching valve 338 is disposed below the front end portion of the bottom wall 74 of the floor frame 72. The inching valve 338 is attached to the bottom wall 74 below the operator's seat 13. FIG. 12 is a bottom view of the floor frame 72 seen from below. As shown in FIG. 12, the inching valve 338 is positioned rightward of the bottom wall 74.

Figure 14:
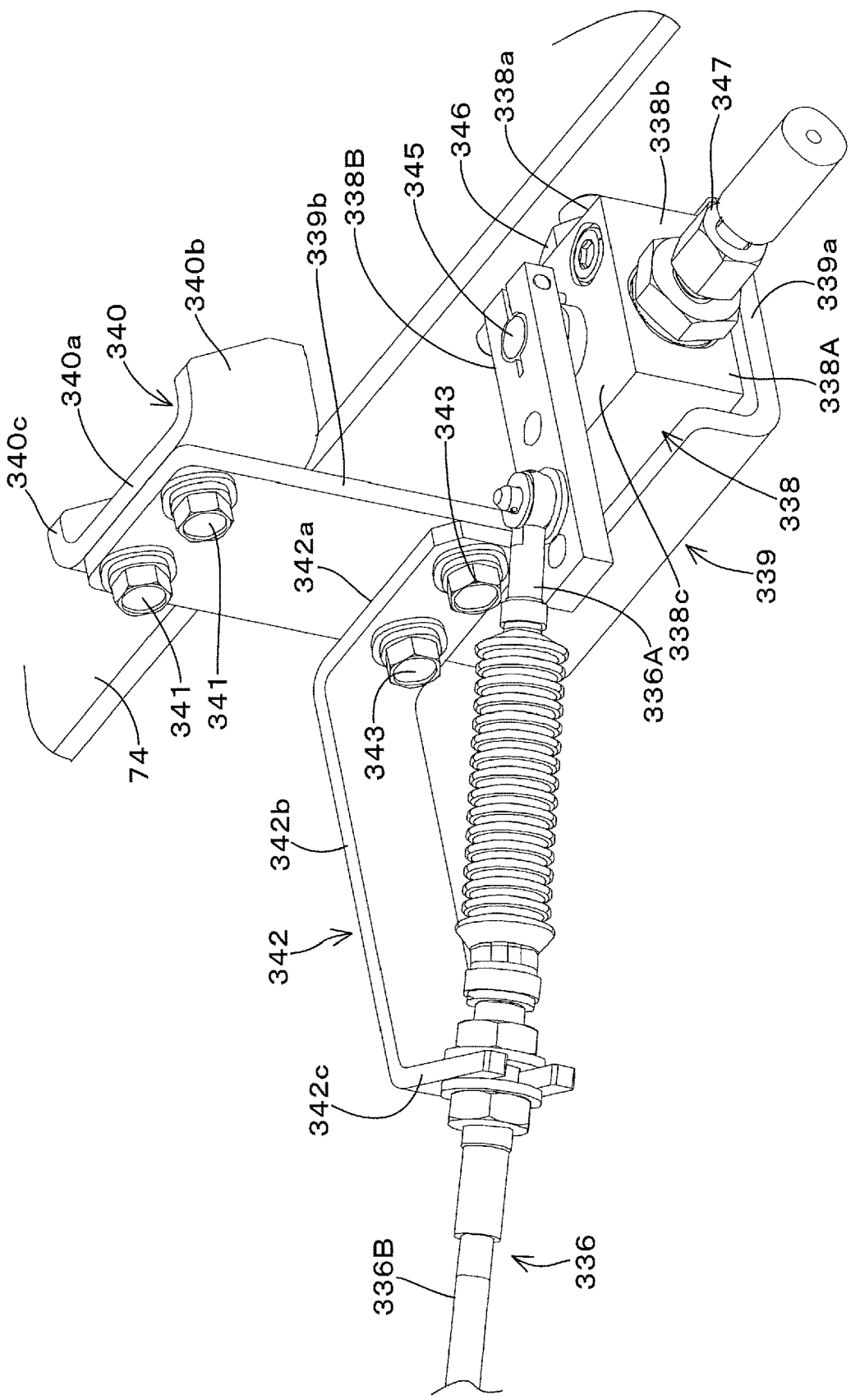
FIG. 14 is a perspective view of the attachment of the inching valve.

As shown in FIG. 14, the inching valve 338 is attached to a valve bracket 339, and the valve bracket 339 is attached to an attachment bracket 340 fixed to the bottom wall 74. The valve bracket 339 includes a valve attachment portion 339a to which the inching valve 338 is attached and a bracket attachment portion 339b extending upward from the valve attachment portion 339a. The attachment bracket 34 is fixed to an upper surface of the bottom wall 74 so that a front end portion of the attachment bracket 34 slightly protrudes from the front end of the bottom wall 74. The attachment bracket 340 includes an attachment wall 340a erected on the bottom wall 74 so that an attachment surface (front surface) of the attachment bracket 340 faces forward, a first side wall 340b extending rearward from one end portion of the attachment wall 340a in the machine width direction K2, and a second side wall 340c extending rearward from the other end portion of the attachment wall 340a in the machine width direction K2. An upper portion of the bracket attachment portion 339b overlaps the front surface of the attachment wall 340a and is attached to the attachment wall 340a by bolts 341.

As shown in FIG. 14, a second cable stay 342 to which the other end portion of the cable 336 is attached is attached to the bracket attachment portion 339b. The second cable stay 342 includes a first wall portion 342a, a second wall portion 342b, and a third wall portion 342c. The first wall portion 342a overlaps a front surface of the bracket attachment portion 339b and is fixed to the bracket attachment portion 339b by bolts 343. The second wall portion 342b extends forward from a machine-width outward end portion of the first wall portion 342a. The third wall portion 342c extends inward in the machine-width direction from the second wall portion 342b. In detail, the third wall portion 342c extends in an inclining direction forward in the machine inward direction. An outer cable 336B is attached to the third wall portion 342c.

As shown in FIG. 14, the inching valve 338 includes a valve main body 338A having a rectangular block shape and a valve lever 338B for operating the valve main body 338A. The valve main body 338A is attached horizontally to the valve bracket 339. The valve main body 338A includes a first joint port 346 on the back surface 338a, a second joint port 347 on one side surface (left surface) 338b, and an operation shaft 345 on an upper surface 338c.

As shown in FIG. 12, the first joint port 346 is connected to a delivery circuit 351 of a hydraulic pump 349 via a hydraulic hose (first hydraulic hose) 350. The hydraulic pump 349 is, for example, a constant-displacement pump, and is connected to a side portion of the prime mover 352 to be driven by power of the prime mover 352. The hydraulic pump 349 delivers hydraulic fluid stored in the hydraulic fluid tank (tank) 344. Specifically, the hydraulic pump 349 delivers hydraulic fluid (pilot fluid) that hydraulically controls the hydraulic driving device 353. The hydraulic fluid tank 344 is positioned leftward of the inching valve 338 (a lateral side of a portion on which the second joint port 347 is disposed). The second joint port 347 is connected to the hydraulic fluid tank 344 via a hydraulic hose (second hydraulic hose) 354.

The hydraulic driving device 353 includes, for example, an HST (Hydro Static Transmission), and drives the traveling device 17 with a hydraulic pressure. In detail, the HST 353 according to the present embodiment includes a swash-plate variable displacement pump, serving as an HST pump 355, configured to be driven by the power of the prime mover 352, and an HST motor 357 fluidly connected to the HST pump 355 to form a closed circuit with a pair of fluid lines 356a and 356b and is driven by fluid delivered from the HST pump 355 to drive the traveling device 17.

The HST pump 355 can change a hydraulic fluid delivery direction thereof by swinging the swash plate 355A configured to swing in one or the other direction from a neutral position. When the hydraulic fluid is delivered to the fluid line 356a or 356b from the HST pump 355, the HST motor 357 switches its rotational direction to selectively output either a forward-traveling power or a backward-traveling power to the traveling device 17.

The HST 353 has a servo cylinder 358 configured to define an angle of the swash plate 355A of the HST pump 355. The servo cylinder 358 is connected to a forward/reverse switching valve 359 by a forward-traveling fluid line 360 and a reverse-traveling fluid line 361. The forward/reverse switching valve 359 is connected to the delivery circuit 351 of the hydraulic pump 349 via a supply fluid line 362 and connected to the hydraulic fluid tank 344 via a tank fluid line 363.

The servo cylinder 358 swings the swash plate 355A in the forward-traveling direction when the pilot fluid is supplied from the forward/reverse switching valve 359 to the forward-traveling fluid line 360, swings the swash plate 355A in the reverse-traveling direction when the pilot fluid is supplied from the forward/reverse switching valve 359 to the reverse-traveling fluid line 361, and holds the swash plate 355A at the neutral position when the pilot fluid is not supplied to the forward-traveling fluid line 360 or the reverse-traveling fluid line 361.

The valve main body 338A (inching valve 338) is formed of a rotary valve, and the operation shaft 345 is formed integrally with (or separately formed and connected with) a rotary spool of the valve main body 338A. The operation shaft 345 is rotatable around the vertical axis, and by rotating around the vertical axis, the inching valve 338 is switched between an OFF-state (closing state) and an ON-state (opening state). When the inching valve 338 is switched to the OFF-state, the connecting fluid line that connects the first joint port 346 to the second joint port 347 is closed. In this manner, the pilot fluid delivered from the hydraulic pump 349 can be supplied to the forward/reverse switching valve 359, and the swash plate 355A swigs in either the forward-traveling direction or the reverse-traveling direction according to the switching of the forward/reverse switching valve 359. When the inching valve 338 is switched to the ON-state (opening state), the connecting fluid line connecting the first joint port 346 to the second joint port 347 is opened. In this manner, the pilot fluid delivered from the hydraulic pump 349 is discharged to the hydraulic fluid tank 344 and is not supplied to the forward/reverse switching valve 359. At this time, when the swash plate 355A is tilted in the forward-traveling direction or the reverse-traveling direction, the tilted swash plate 355A moves to or toward the neutral position, and the traveling device 17 decelerates or stops. Since the degree of valve opening of the inching valve 338 changes according to a rotation angle of the operation shaft 345 (since a discharging amount of pilot fluid discharged to the hydraulic fluid tank 344 varies), reduction in speed of the traveling device 17 can be adjusted by the inching valve 338.

As shown in FIG. 14, the valve lever 338B has one end portion pinched by and fixed to the operation shaft 345. Accordingly, the valve lever 338B can be turned around the vertical axis (an axial center of the operation shaft 345) together with the operation shaft 345. The other end portion of the cable 336 is connected to the other end portion of the valve lever 338B. In detail, the other end portion of the inner cable 336A is connected to the other end portion of the valve lever 338B. Accordingly, the inching valve 338 is operably connected to the brake pedals (pedals) 111L and 111R via the cable 336.

When the brake pedals 111L and 111R are not depressed, the valve lever 338B protrudes forward from the operation shaft 345 as shown in FIG. 14, and in this state the inching valve 338 is in the OFF-state. When the brake pedals 111L and 111R are depressed, the brake arm 118 (arm portion 120) swings downward, and the cable 336 (inner cable 336A) is pushed. Then, the valve lever 338B is pushed by the cable 336 and rotates around the vertical axis together with the operation shaft 345. That is, when the brake pedals 111L and 111R are depressed, the valve lever 338B swings leftward around the vertical axis (the axial center of the operation shaft 345) and rotates the operation shaft 345. In this manner, the inching valve 338 turns on, the swash plate 355A returns to the neutral position, and power is no longer output from the HST 353 to the traveling device 17. Accordingly, by depressing the brake pedals 111L and 111R, the braking device is activated to brake the traveling device 17, and the HST 353 is set to the neutral state.

In the above configuration, the brake pedals 111L and 111R and the inching valve 338 are attached to the floor frame 72 supported by the machine body 2 via the mounting member 303. In other words, the brake pedals 111L and 111R and the inching valve 338 are attached to the same vibration system. Accordingly, since the brake pedals 111L and 111R, the cable 336 and the inching valve 338 move together with the floor frame 72 due to the vibration of the machine body 2, it is possible to suppress the inching valve 338 from being affected by the traveling vibrations and the working vibrations.

By operably connecting the brake pedals 111L and 111R to the inching valve 338 with the cable 336, flexibility of the mounting position of the inching valve 338 can be improved.

In addition, although the vibrations of the machine body 2 mainly include vibrations in the vertical direction (vertical vibrations), the valve lever 338B is attached to the valve main body 338A so that the valve lever 338B can be rotated around the vertical axis, and is configured to rotate around the vertical axis to operate the inching valve 338. Accordingly, the valve lever 338B can be prevented from being moved by the vertical vibrations of the machine body 2, and reduction in traveling speed caused by movement of the valve lever 338B by the vibrations in the vertical direction can be prevented.

As shown in FIG. 13, a seat base 76 is attached to the bottom wall 74, and the operator's seat 13 is attached to the seat base 76. In detail, the operator's seat 13 is attached to a suspension device 364 attached to the seat base 76. The seat base 76 includes an upper wall 76a and a front wall 76b extending downward from a front end of the upper wall 76a. An attachment wall 76c extends from a lower end of the front wall 76b, and the attachment wall 76c is bolted to a front portion of the bottom wall 74. The seat base 76 includes a support leg 76d to which the openable cover 78 is attached. In detail, the support leg 76d extends upward from a front end of the attachment wall 76c, and an upper portion of the support leg 76d is bent forward. A rear portion of the openable cover 78 is detachably attached to the upper portion of the support leg 76d by bolts or the like. The attachment bracket 340, the inching valve 338, the valve bracket 339 and the second cable stay 342 are disposed below the rear portion of the openable cover 78. Accordingly, the inching valve 338 is accessible when the rubber mat 332 laid on the floor part 75 and the openable cover 78 are removed. This allows inspection and assembly of the inching valve 338 and other parts.

In assembling the inching valve 338 to the cabin 14, the inching valve 338 and the second cable stay 342 are first attached to the valve bracket 339 in sub-assembling before assembling the cabin 14 to the machine body frame 71. The first hydraulic hose 350 is connected to the hydraulic pump 349 side, and the second hydraulic hose 354 is connected to the hydraulic fluid tank 344. The cabin 14 is assembled via the mounting members 303 to the machine body frame 71 from above in a state where the brake pedals 111L and 111R, the brake arm 118, the cable 336, and the like have been assembled and the openable cover 78 is still removed. After assembling the cabin 14 to the machine body frame 71, the cable 336 is attached to the second cable stay 342 through the inspection opening 77a, and the first hydraulic hose 350 and the second hydraulic hose 354 are attached to the inching valve 338. Under this state, attach the valve bracket 339 is attached to the attachment bracket 340. In this manner, the inching valve 338 and the like can be easily assembled.

Figure 15:
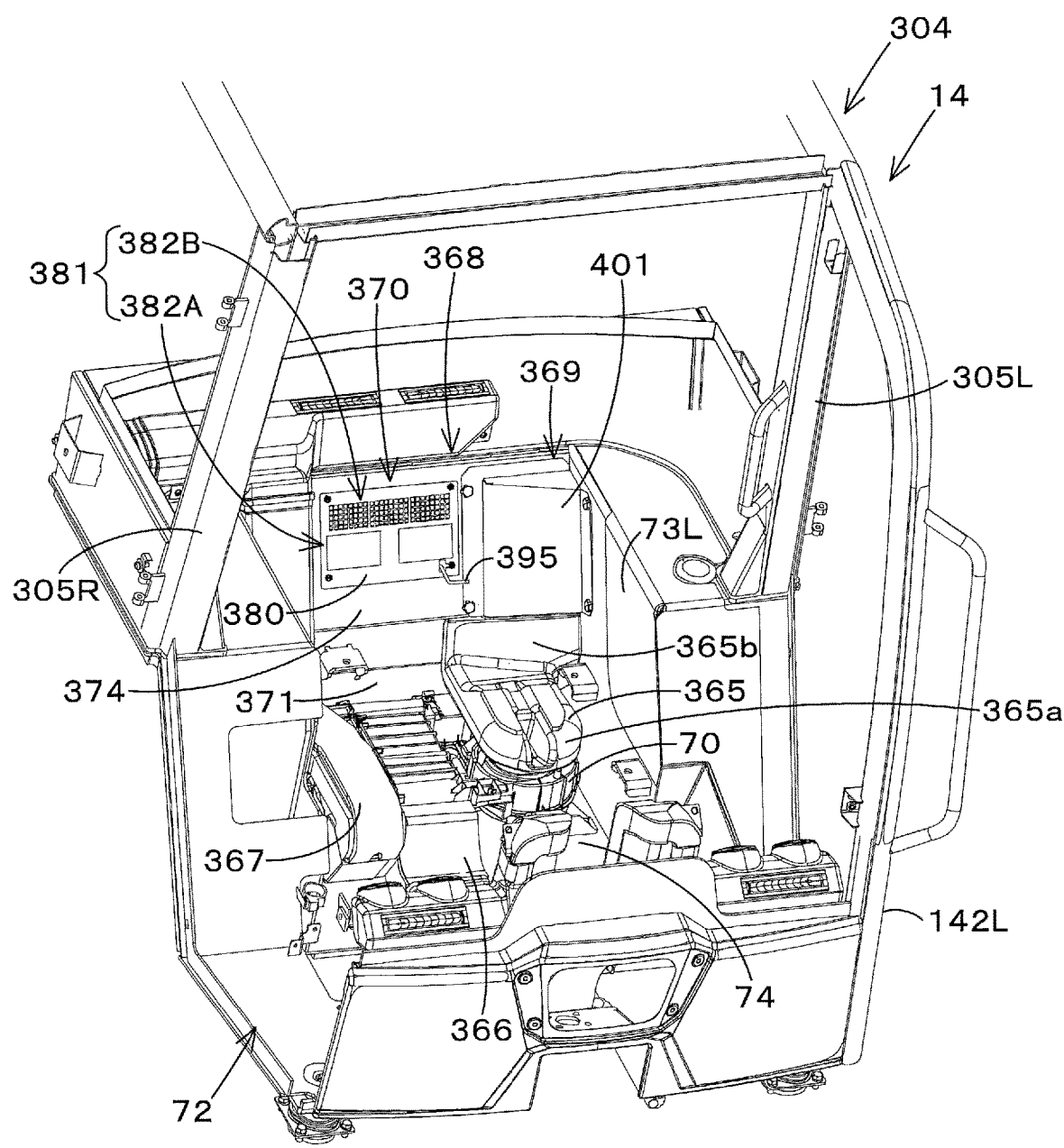
FIG. 15 is a front perspective view of a room of the cabin.

As shown in FIG. 15, an air-conditioner main unit 70 for air conditioning of the cabin interior is disposed at a rear portion of the floor frame 72. The air-conditioner main unit 70 is disposed at a position deviated to the left from the center portion of the floor frame 72 in the machine width direction K2. An introducing duct 365 is provided above the air-conditioner main unit 70 to introduce inside-air (air inside the cabin interior) and outside-air (air outside the cabin interior) into the air-conditioner main unit 70. On a right side portion of the air-conditioner main unit 70, a first guiding duct 366 is disposed to guide the conditioned air blown from the air-conditioner main unit 70 to the front portion of the cabin 14. On a right side portion of the first guiding duct 366, a second guiding duct 367 is disposed to guide the conditioned air blown in the first guiding duct 366 to the rear portion of the cabin 14.

As shown in FIG. 13, the air-conditioner main unit 70 is disposed below the operator's seat 13 (in the seat base 76) and is attached to the bottom wall 74. The air-conditioner main unit 70 includes a case 70A and a blower 70B, an evaporator, and the like housed in the case 70A, and constitutes a main body of the air-conditioning unit installed in the working machine 1. The air-conditioner main unit 70 is disposed in front of a back-surface lower wall 371 which defines a lower portion of a back surface of the floor frame 72. As shown in FIG. 8B, the back-surface lower wall 371 is provided extending between the first side wall 73L and the second side wall 73R. The back-surface lower wall 371 includes a first wall portion 371a that rises upward from a rear end portion of the bottom wall 74 and a second wall portion 371b that is inclined and shifts upwardly backward from an upper end of the first wall portion 371a. A wall portion 371c constituting a left portion of the second wall portion 371b extends upward of the center portion and a right portion of the second wall portion 371b.

As shown in FIG. 13, the introducing duct 365 includes a duct body 365a connected to an inside of the air-conditioner main unit 70, and an extension duct 365b extending from the duct body 365a in an inclining direction that shifts upwardly backward. An upper end of the extension duct 365b is opened. An upper portion of this extension duct 365b serves as is used as an introducing port 365c to introduce the air.

As shown in FIG. 15, an inside-air/outside-air introducing portion 368 is provided to the rear portion of the floor frame 72 to introduce the inside-air and outside-air into the air-conditioner main unit 70. The inside-air/outside-air introducing portion 368 is provided on an upper portion of the floor frame 72. In detail, the inside-air/outside-air introducing portion 368 is disposed above the back-surface lower wall 371. The inside-air/outside-air introducing portion 368 is disposed behind the operator's seat 13 (see FIG. 19). The inside-air/outside-air introducing portion 368 includes an inside-air/outside-air switching portion 370 configured to be switched between an inside-air introducing state and an outside-air introducing state, and a filter housing portion 369 that houses a filter 372 (see FIG. 18) that catches dusts included in the inside-air or outside-air introduced by the inside-air/outside-air switching portion 370. The inside-air/outside-air switching portion 370 and the filter housing portion 369 are provided side by side adjacent to each other in the machine width direction K2. In detail, the inside-air/outside-air switching portion 370 is substantially provided to the center portion in the machine width direction K2, and the filter housing portion 369 is provided on a side portion of the inside-air/outside-air switching portion 370, the side portion corresponding to the air-conditioner main unit 70. Roughly explaining the flow of air taken into the air-conditioner main unit 70, the inside-air or outside-air is sucked by the blower 70B in the air-conditioner main unit 70 and taken into the inside-air/outside-air switching portion 370. The air taken into the inside-air/outside-air switching portion 370 enters the introducing duct 365 from the introducing port 365c through the filter housing portion 369, and is taken into the air-conditioner main unit 70.

Figure 16:
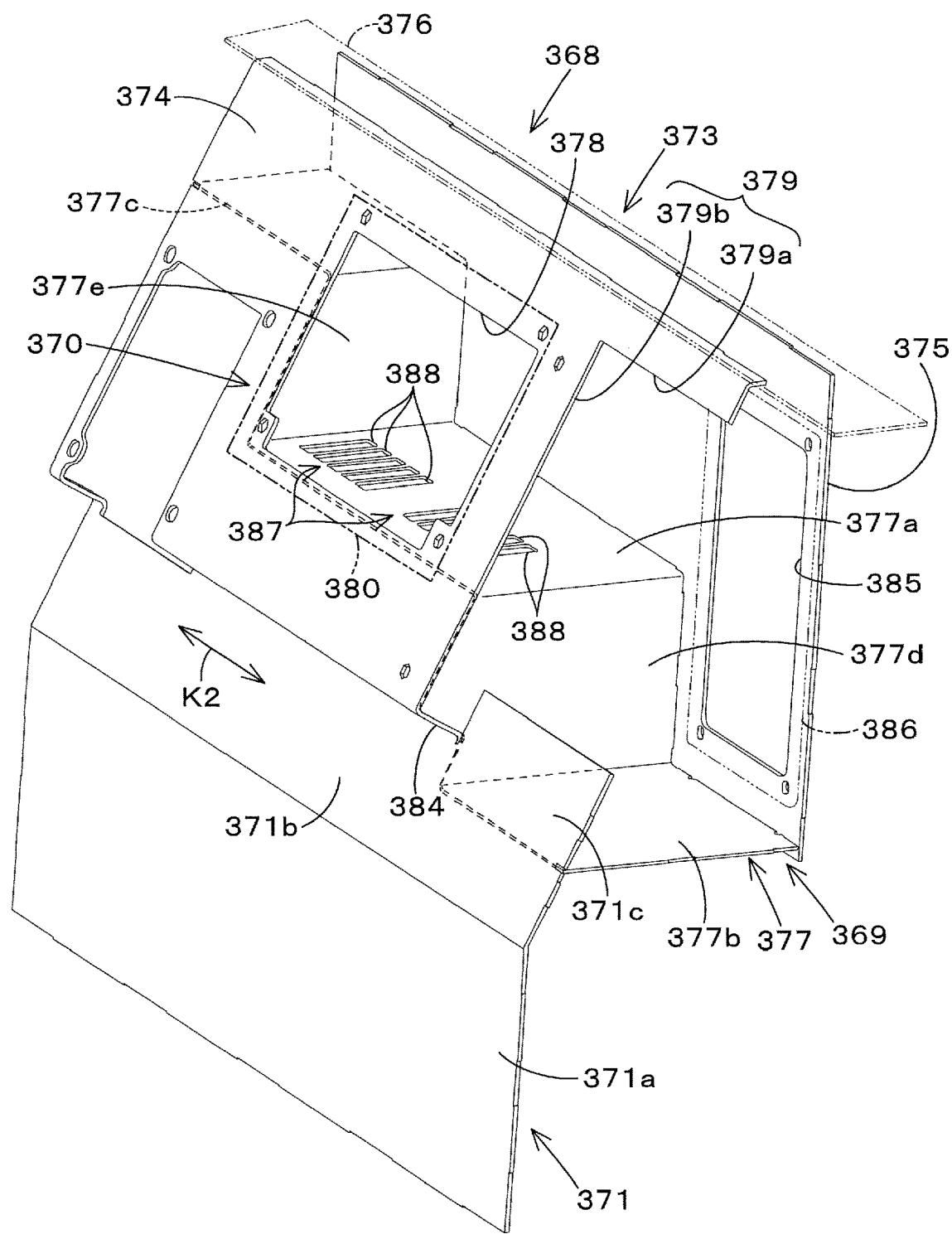
FIG. 16 is a perspective view of a rear portion of the floor frame.

As shown in FIGS. 8B and 16, the inside-air/outside-air introducing portion 368 includes an inside-air/outside-air introducing box 373 forming a part of the inside-air/outside-air switching portion 370 and a part of the filter housing portion 369. The inside-air/outside-air introducing box 373 is constituted of a front wall 374, a rear wall 375, an upper wall 376, a bottom wall 377, a first side wall 73L and a second side wall 73R.

The front wall 374 is positioned above the back-surface lower wall 371, and is connected to an upper end of the back-surface lower wall 371 via a connecting wall 384 at the center portion in the machine width direction K2. The rear wall 375 is positioned behind the front wall 374 with a clearance. The upper wall 376 is provided extending from an upper end of the front wall 374 to the rear wall 375. The bottom wall 377 is formed extending from the front wall 374 to the rear wall 375. The first side wall 73L constitutes a left side surface of the inside-air/outside-air introducing box 373. The second side wall 73R constitutes a right side surface of the inside-air/outside-air introducing box 373. The inside-air/outside-air introducing box 373 is not provided with a member that divides the inside into parts in the machine width direction K2. That is, the inside of the inside-air/outside-air introducing box 373 is continuous in the machine width direction K2. Accordingly, the inside of the inside-air/outside-air switching portion 370 is connected to the inside of the filter housing portion 369.

Figure 17:
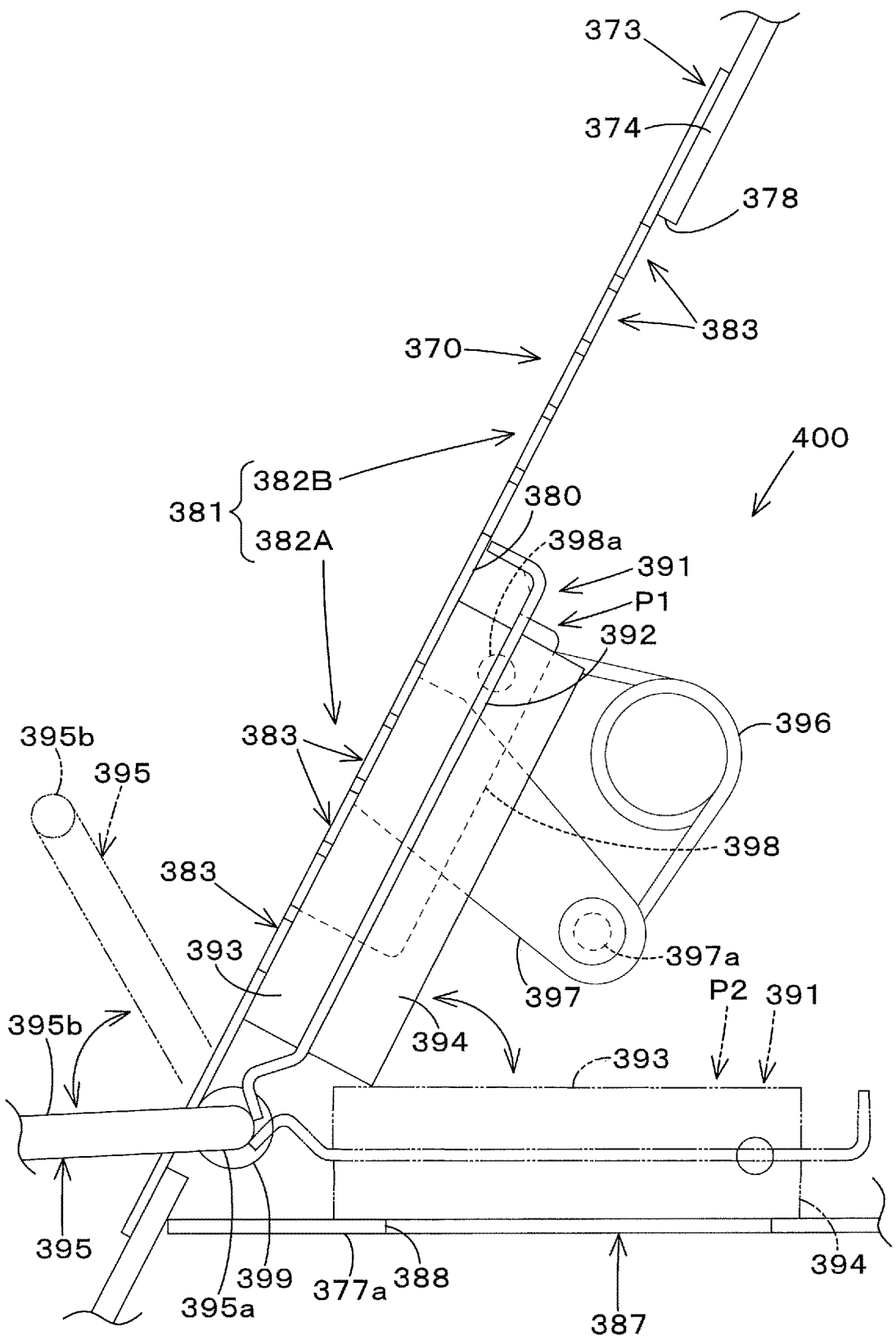
FIG. 17 is a cross section view of an inside-air/outside-air switching portion.

The front wall 374 is formed in an inclined shape that shifts upwardly rearward. The front wall 374 includes an opening portion 378 defined by a rectangular opening edge at the center portion in the machine width direction K2. The opening portion 378 is closed from the front of the machine body by a closure plate 380 attached to the front wall 374. An inside-air introducing port 381 from which the inside-air is taken is formed in the closure plate 380. As shown in FIG. 15, the inside-air introducing port 381 includes a lower introducing port 382A formed in a lower portion of the closure plate 380 and an upper introducing port 382B formed in an upper portion of the closure plate 380. As shown in FIG. 17, the lower introducing port 382A and the upper introducing port 382B are constituted of aggregation of a large number of small holes.

As shown in FIG. 16, the front wall 374 includes a left portion having a notch 379. The notch 379 is defined by an upper edge portion 379a and a side edge portion 379b extending downward from a right end of the upper edge portion 379a, and is opened downward and to the left. The notch 379 is formed at a position corresponding to the wall portion 371c.

As shown in FIG. 16, the bottom wall 377 is formed in a stepwise shape in the machine width direction K2. The bottom wall 377 includes a first portion 377a at the center portion in the machine width direction K2, a second portion 377b positioned leftward of the first portion 377a, and a third portion 377c positioned rightward of the first portion 377a. The first portion 377a is formed at a higher position than the second portion 377b. The third portion 377c is formed at a higher position than the first portion 377a. The first portion 377a extends backward from a lower edge portion of the opening portion 378 toward the rear wall 375. The first portion 377a forms a bottom portion of the inside-air/outside-air switching portion 370. In the first portion 377a, an outside-air introducing port 387 through which the outside-air is taken is formed. The outside-air introducing port 387 is constituted by forming a plurality of long holes 388 that are long in the front-to-back direction K1 and aligning them in the machine width direction K2.

Figure 18:
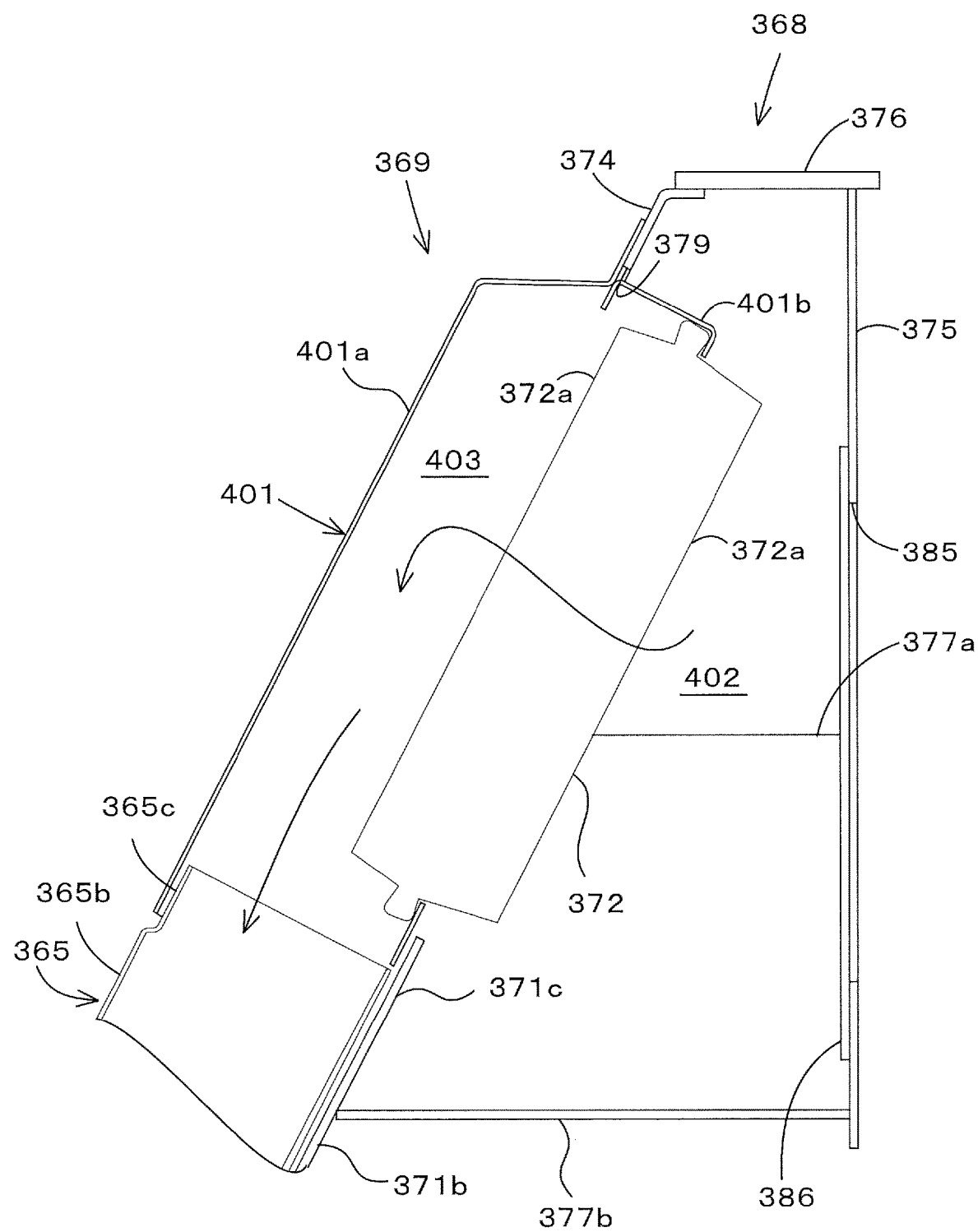
FIG. 18 is a cross section view of a filter housing portion.

As shown in FIGS. 16 and 18, the second portion 377b extends from a position lower than an upper end of the wall portion 371c toward the rear wall 375. The second site 370b forms a bottom portion of the filter housing portion 369. An inspection opening 385 is formed in the portion forming the filter housing portion 369 at the left portion of the rear wall 375. The inspection opening 385 is closed from the front of the machine body by a closure member 386 attached to the rear wall 375.

As shown in FIG. 16, the bottom wall 377 includes a first vertical wall 377d connecting the first portion 377a to the second portion 377b, and a second vertical wall 377e connecting the first portion 377a to the third portion 377c.

As shown in FIG. 19, a partition member 389 defining a front surface of the prime mover room E1 is provided behind the floor frame 72. The partition member 389 is formed of a plurality of plates. The partition member 389 may be formed of a single plate material. A fuel tank 390 is disposed between the partition member 389 and the floor frame 72. The fuel tank 390 is provided below the first portion 377a and the third portion 377c. Since the first portion 377a and the third portion 377c are formed at a higher position than the second portion 377b, the height of the fuel tank 390 can be made higher and the capacity of the fuel tank 390 can be increased. The outside-air introducing port 387 is provided above the fuel tank 390. Accordingly, outside-air is taken into the inside-air/outside-air introducing portion 368 (inside-air/outside-air switching portion 370) from a housing portion of the fuel tank 390 inside the machine body frame 71 and in front of the partition member 389. A bottom opening 71B is formed in the bottom portion 71A of the machine body frame 71. The outside-air is taken into the inside of the machine body frame 71 through the bottom opening 71B. The outside-air is taken from a portion isolated from the prime mover room E1 in the inside of the machine body frame 71. This allows the outside-air to be taken from a portion that is not affected by the exhaust gas emitted from the prime mover 352 and the heat of the prime mover 352.

As shown in FIG. 17, the inside-air/outside-air switching portion 370 includes an inside-air/outside-air switching mechanism 400 configured to be switched between a state in which no outside-air is taken and only inside-air is taken and a state in which both the outside-air and the inside-air are taken. The configuration of the inside-air/outside-air switching portion 370 is not limited to this configuration; for example, the inside-air/outside-air switching portion 370 may be configured to be switched between a state in which only the inside-air is taken and a state in which only the outside-air is taken.

The inside-air/outside-air switching portion 370 is formed by including the inside-air/outside-air introduction box 373, the closure plate 380, and the inside-air/outside-air switching mechanism 400.

The inside-air/outside-air switching mechanism 400 includes a switching damper 391 having an outside-air introducing position P1 (see a solid line) where outside-air is taken and an inside-air introducing position P2 (see a double-dotted chain line) where inside-air is taken without the outside-air, and is configured to be switched between the positions. The switching damper 391 is disposed rearward of the closure plate 380 (inside the inside-air/outside-air switching portion 370). The switching damper 391 is disposed downward of the upper introducing port 382B at the outside-air introducing position P1. Accordingly, the switching damper 391 closes the lower introducing port 382A at the outside-air introducing position P1. That is, when the switching damper 391 is switched to the outside-air introducing position P1, the inside-air from the upper introducing port 382B and the outside-air from the outside-air introducing port 387 are taken into the inside-air/outside-air switching portion 370 (inside-air/outside-air introducing box 373). At the inside-air introducing position P2, the switching damper 391 closes the outside-air introducing port 387. Accordingly, when the switching damper 391 is switched to the inside-air introducing position P2, no outside-air is taken and inside-air is taken into the inside-air/outside-air introduction box 373 from the lower introducing port 382A and the upper introducing port 382B.

As shown in FIG. 17, the switching damper 391 includes a plate member 392, a first cushion member 393, a second cushion member 394, and a contacting member 398. The first cushion member 393 is fixed to one side surface of the plate member 392 and closes the lower introducing port 382A at the outside-air introducing position P1. The second cushion member 394 is fixed to the other side surface of the plate member 392 and closes the outside-air introducing port 387 at the inside-air introducing position P2. The contacting member 398 is fixed to the plate member 392 and contacts to the closure plate 380 at the outside-air introducing position P1 and contacts to the first portion 377a at the inside-air introducing position P2.

The inside-air/outside-air switching mechanism 400 includes a switching lever 395 for operating the switching damper 391 and a supporting boss (cylindrical member) 399 pivotally supporting the switching lever 395. The switching lever 395 includes a lever base portion 395a and a gripping portion 395b. The supporting boss 399 is positioned downward of the inside-air introducing port 381 and forward of the outside-air introducing port 387. The supporting boss 399 includes an axial center extending in the machine width direction K2 and is fixed to a lower portion of the closure plate 380. The lever base portion 395a is supported by the supporting boss 399 rotatably around an axial center extending in the machine width direction K2. A plate member 392 is fixed to the lever base portion 395a. Accordingly, the switching damper 391 is rotated around the axial center of the lever base portion 395a through upward and downward swinging operations of the switching lever 395, and is repositioned between the outside-air introducing position P1 and the inside-air introducing position P2. The switching lever 395 protrudes forward (toward the operator's seat 13) from the closure plate 380 and can be operated by an operator from the operator's seat 13 side.

As shown in FIG. 17, the inside-air/outside-air switching mechanism 400 includes a biasing member 396 that holds the switching damper 391 at the outside-air introducing position P1 or at the inside-air introducing position P2. The biasing member 396 is formed of a torsional coil spring, and includes one end portion fixed to a pin 398a provided to the contacting member 398. The inside-air/outside-air switching mechanism 400 includes a bracket 397 that is fixed to the other end portion of the biasing member 396. The bracket 397 is fixed to a back surface of the closure plate 380 and protrudes rearward from the closure plate 380. A pin 397a is fixed to a rear portion of the bracket 397, and the other end portion of the biasing member 396 is fixed to the pin 397a. A biasing force of the biasing member 396 acts in a direction of pushing the switching damper 391 against the closure plate 380 at the outside-air introducing position P1, and acts in a direction of pushing the switching damper 391 against the first portion 377a at the inside-air introducing position P2. A notched opening is formed in the plate member 392 so that the plate member 392 is prevented from interfering with the contacting member 398, the biasing member 396 and the bracket 397. The first cushion member 393 and the second cushion member 394 are separated right and left from each other with respect to the contacting member 398, the biasing member 396, and the bracket 397 (see FIG. 20).

Figure 20:
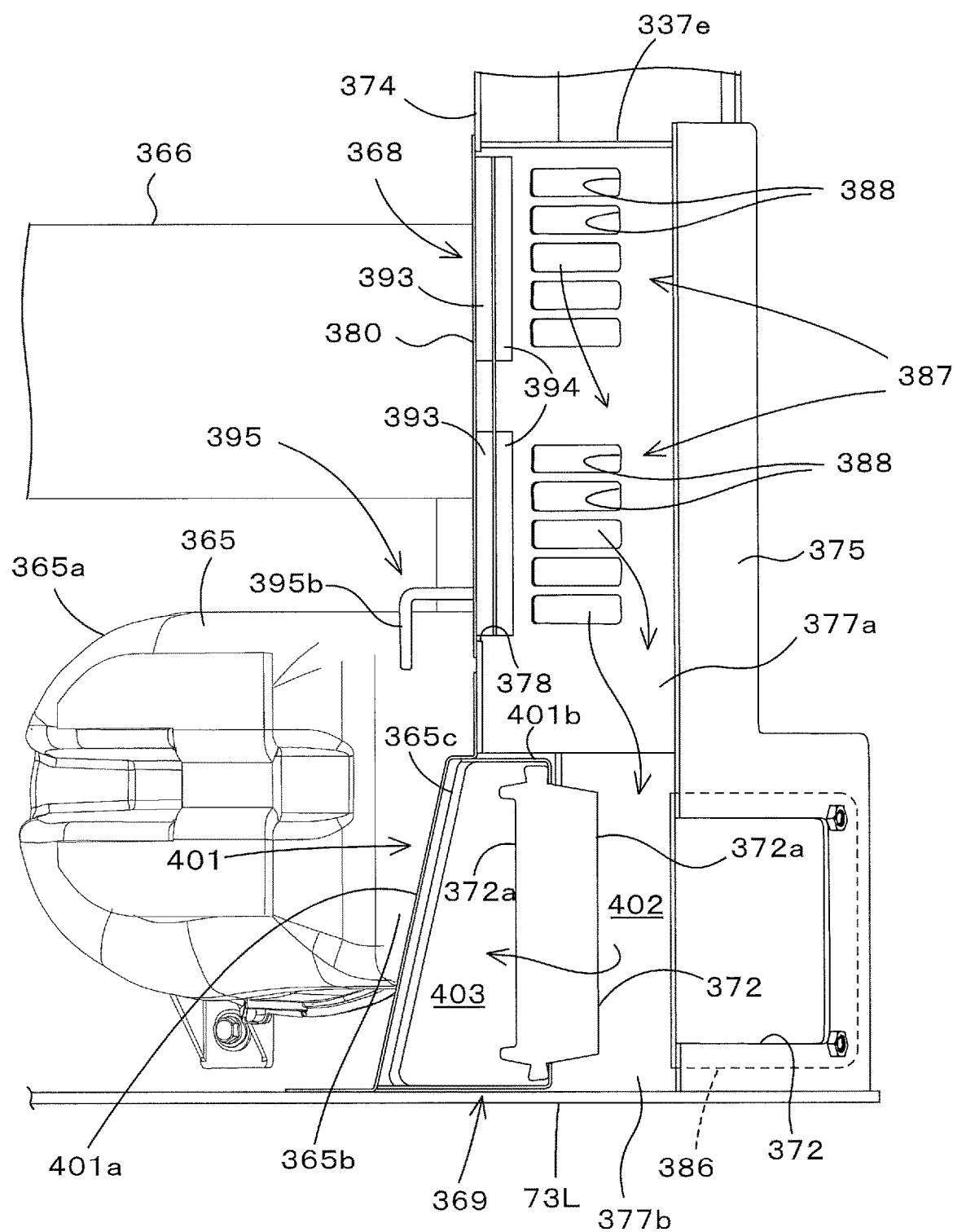
FIG. 20 is a cross section view of an inside-air/outside-air introducing portion.

As shown in FIGS. 18 and 20, the filter housing portion 369 includes a filter bracket 401 to which the filter 372 is attached. The filter housing portion 369 is formed by including the inside-air/outside-air introducing box 373, the filter 372, and the filter bracket 401.

As shown in FIG. 15, the filter bracket 401 is bolted to the front wall 374 and the first side wall 73L so as to cover the notch 379.

As shown in FIGS. 18 and 20, the filter 372 is attached to a rear portion of the filter bracket 401. The filter 372 is a flat plate filter that allows the air to flow in a thickness direction to catch dusts. The filter 372 is disposed vertically so that the filter surfaces 372a face back and forth. In detail, the filter 372 is attached to be inclined shifting upwardly backward. The inside-air/outside-air switching portion 370 is connected to a back surface side of the filter 372 in the filter housing portion 369. In detail, a first flow passage 402 in which the air can flow is formed between the filter 372 and the rear wall 375, and this first flow passage 403 is connected to the inside of the inside-air/outside-air switching portion 370.

As shown in FIG. 18, the introducing duct 365 is connected to a front surface side of the filter 372 in the filter housing portion 369. In detail, a second flow passage 403 in which the air can flow is formed between the filter 372 and the front portion 401a of the filter bracket 401, and the introducing duct 365 (introducing port 365c) is connected to the filter housing portion 369 at the front surface side of and below the filter 372. The second flow passage 403 is connected to the introducing duct 365.

The inside-air and the outside-air taken into the inside-air/outside-air switching portion 370 reach the first flow passage 402, pass through the filter 372 from the first flow passage 402 to reach the second flow passage 403, and then are taken into the air-conditioner main unit 70 from the second flow passage 403 through the introducing duct 365.

As described above, the working machine 1 according to the embodiment includes the machine body 2, the operator's seat 13 mounted on the machine body 2, the opening part (opening portion) 313 provided opposed to the entrance passage (the entrance gate) 309 that is provided on one side portion of the operator's seat 13, and provided to connect a space on the floor part 75 disposed forward of the operator's seat 13 to the outside of the machine body, and the blocking member 325 blocking an operator from boarding and alighting through the opening part 313.

According to this configuration, the blocking member 325 can prevent the operator from boarding on and alighting from the working machine 1 through the opening 313 on the opposite side to the entrance passage (the entrance gate) 309.

In addition, the working machine 1 includes the cabin 14 having the first door 172 disposed in the entrance passage 309 and the second door 314 disposed in the opening part 313.

According to this configuration, the blocking member 325 can prevent the operator from boarding on and alighting from the working machine 1 through the opening 314 on the opposite side to the entrance passage (the entrance gate) 309.

In addition, the working machine 1 includes the front strut (the second front strut 142R) disposed forward of the other side portion of the operator's seat 13, and the rear strut (the second rear strut 305R) disposed behind the front strut (the second front strut 142R) and on the other side portion of the operator's seat 13. The door 314 is openably provided between the front strut (the second front strut 142R) and the rear strut (the second rear strut 305R).

According to this configuration, by opening the door 314, objects can be taken in and out of the cabin interior from the opposite side to the entrance gate 309, and the floor part 75 of the cabin 14 can be cleaned.

In addition, the working machine 1 includes the operation console 319 provided on the other side portion of the operator's seat 13, and the front strut (the second front strut 142R) disposed forward of the other side portion of the operator's seat 13. The blocking member 325 is provided to extend at least from the operation console 319 and the front strut (the second front strut 142R).

According to this configuration, the blocking member 325 can be disposed away from the operator's seat 13, and the blocking member 325 can be prevented from interfering with an operator's seated on the operator's seat 13.

In addition, the operation console 319 includes a front portion having the operation lever 16, and the blocking member 325 is disposed at a position overlapping the operation lever 16 in a sight direction of the operator's seating on the operator's seat 13.

According to this configuration, even when the blocking member 325 is provided, the blocking member 325 can be prevented from interfering with the operator's side sight.

In addition, the operator's seat 13 includes the seat portion 13A and the backrest 13B, the blocking member 325 is formed of a rod member and extends in the machine fore-and-aft direction K1, and is disposed downward of an upper end of the operation lever 16 and upward of a bottom surface of the seat portion 13A.

According to this configuration, while preventing the operator from boarding on and alighting from the operator's seat, the blocking member 325 can be prevented from interfering with the operator's sight.

In addition, the working machine 1 includes the attachment tab 326 fixed to the front strut (the second front strut 142R). The operation console 319 includes the supporting bracket 321 supporting the operation lever 16, and the console box 319A covering the supporting bracket 321. The blocking member 325 includes a front portion attached to the attachment tab 326 and a rear portion attached to the supporting bracket 321 in the console box 319A.

According to this configuration, the blocking member 325 can be removed. Since it is not possible to remove the blocking member 325 without detaching the console box 319A, the blocking member 325 can be prevented from being easily removed.

In addition, the door 314 has light transmission properties.

According to this configuration, the operator can see side areas through the door 314, and thus the operator's side view can be improved.

The working machine 1 according to the embodiment includes the machine body 2, the traveling device 17 travelably supporting the machine body 2, the hydraulic driving device 353 to hydraulically drive the traveling device 17, the floor frame 72 supported on the machine body 2 via the mounting member 303, the pedals (brake pedals 111L and 111R) operable to brake the traveling device 17, the inching valve 383 to change a flow rate of hydraulic fluid supplied to the hydraulic driving device 353 according to operation of the pedals (brake pedals 111L and 111R), and the cable 336 operably connecting the pedals (brake pedals 111L and 111R) to the inching valve 338. The pedals (brake pedals 111L and 111R) and the inching valve 338 are attached to the floor frame 72.

According to this configuration, by operably connecting the pedals (brake pedals 111L and 111R) to the inching valve 338 with the cable 336, flexibility of the mounting position of the inching valve 338 can be improved. In addition, by attaching the pedals (brake pedals 111L and 111R) and the inching valve 338 to the floor frame 72 supported by the machine body 2 via the mounting member 303, that is, by attaching them in the same vibration system, the inching valve 338 can be suppressed from being affected by traveling vibrations and working vibrations.

In addition, the floor frame 72 includes the installation part (bottom wall 74) supporting the operator's seat 13. The inching valve 338 is attached to the installation part (bottom wall 74) below the operator's seat 13.

According to this configuration, the inching valve 338 can be arranged on a lower side portion of the operator's seat 13 with use of a space.

In addition, the floor frame 72 includes the inspection opening 77*a*. The inching valve 338 is disposed below the inspection opening 77*a* so as to be accessible via the inspection opening 77*a*.

According to this configuration, the inching valve 338 can be easily assembled and inspected through the inspection opening 77*a*.

In addition, the floor frame 72 includes the floor part 75 forward of the installation part (bottom wall 74). The floor part 75 includes the floor main body 77 including the inspection opening 77*a*, and the openable cover 78 closing the inspection opening 77*a*. The inching valve 338 is disposed below the openable cover 78.

According to this configuration, by removing the openable cover 78, the inching valve 338 can be easily assembled and inspected.

In addition, the inching valve 338 includes the valve lever 338B operably connected to the cable 336, and the valve main body 338A to which the valve lever 338B is attached. The valve main body 338A changes the flow rate of hydraulic fluid supplied to the hydraulic driving device according to rotation of the valve lever 338B around the vertical axis by operating the pedals (brake pedals 111L and 111R).

According to this configuration, the valve lever 338B can be prevented from being moved by vibrations in the vertical direction, and speed reduction caused by the valve lever 338B being moved by the vibrations in the vertical direction can be prevented.

The working machine 1 further includes the hydraulic pump 349 to deliver the hydraulic fluid. The hydraulic fluid tank 344 is disposed on a lateral side of the inching valve 338. The valve main body 338A includes the back surface 338*a* with the first joint port 346 fluidly connected to the delivery circuit 351 of the hydraulic pump 349, the side surface 338*b*, facing toward the hydraulic fluid tank 344, with the second joint port 347 fluidly connected to the hydraulic fluid tank 344, and the upper surface 338*c* with the operation shaft 345 operably connected to the valve lever 338B.

According to this configuration, the connection between the valve main body 338A and the hydraulic fluid tank 344 can be simplified, and the hydraulic hose connecting the inching valve 338 to the hydraulic fluid tank 344 can be shortened. In addition, by placing the hydraulic pump 349 behind the valve main body 338A, the connection between the valve main body 338A and the hydraulic pump 349 can be simplified. The joint structure between the valve lever 338B and the operation shaft 345 also can be simplified.

In addition, the working machine 1 further includes the frame member (column frame 88) extended upward from a front portion of the floor frame 72, the pedals (brake pedals 111L and 111R) being attached to the frame member, the first cable stay 337 fixed to the frame member (column frame 88), one end portion of the cable 336 being attached to the first cable stay 337, the attachment bracket 340 fixed to the installation part (bottom wall 74), the valve bracket 339 attached to the attachment bracket 340, the inching valve 338 being attached to the valve bracket 339, and the second cable stay 342 attached to the valve bracket 339, the other end portion of the cable 336 being attached to the second cable stay 342.

According to this configuration, the inching valve 338 and the second cable stay 342 can be mounted to the floor frame 72 in a sub-assembled state in which the inching valve 338 and the second cable stay 342 are attached to the valve bracket 339, and the attachment of the inching valve 338 can be easy.

The working machine 1 according to the embodiment includes the machine body 2, the cabin 14 mounted on the machine body 2, the air-conditioner main unit 70 for air-conditioning of a room of the cabin 14, and the inside-air/outside-air introducing portion 368 to introduce, into the air-conditioner main unit 70, inside-air of the room of the cabin 14 and outside-air outside the room. The inside-air/outside-air introducing portion 368 includes the inside-air/outside-air switching portion 370 and the filter housing portion 369. The inside-air/outside-air switching portion includes the inside-air introducing port 381 through which the inside-air is taken, the outside-air introducing port 387 through which the outside-air is taken, and the switching damper 391 switchable between the outside-air introducing position P1 for introducing the outside-air from the outside-air introducing port 387 and the inside-air introducing position P2 for closing the outside-air introducing port 387. The filter housing portion 369 is provided adjacent to the inside-air/outside-air switching portion 370 and in communication to the inside-air/outside-air switching portion 370 and the air-conditioner main unit 70, and is configured to house the filter 372 capable of catching dusts included in the inside-air and outside-air flowing from the inside-air/outside-air switching portion 370 to the air-conditioner main unit 70.

According to this configuration, the filter 372 can be shared by providing the inside-air/outside-air switching portion 370 and the filter housing portion 369 adjacent to each other, the inside-air/outside-air switching portion 370 being configured to be switched between a state in which the outside-air is introduced and a state in which the outside-air is not introduced, the filter housing portion 369 housing the filter 372 for removing dusts from the inside-air and the outside-air flowing from the inside-air/outside-air switching portion 370 to the air-conditioner main unit 70. In addition, since the inside-air introducing port 381, the outside-air introducing port 387, and the switching damper 391 are provided at a single site, the inside-air/outside-air switching portion 370 can be compactly formed.

In addition, the working machine 1 includes the prime mover 352, and the partition member 389 defining a front surface of the prime mover room E1 that houses the prime mover 352. The outside-air introducing port 387 is disposed forward of the partition member 389 in the machine body 2.

According to this configuration, it is possible to reduce the influence of exhaust gas emitted from the prime mover 352 on the intake of outside-air.

In addition, the working machine 1 includes the operator's seat 13 mounted on the machine body 2. The inside-air/outside-air introducing portion 368 includes the inclined front wall 374 disposed rearward of the operator's seat 13 and extended rearwardly upward and the bottom wall 377 extended rearward from the front wall 374. The inside-air introducing port 381 is formed upward of the bottom wall 377 to be closer to the front wall 374. The outside-air introducing port 387 is formed on the bottom wall 377. The inside-air/outside-air switching portion 370 includes the supporting boss 399 disposed downward of the inside-air introducing port 381 and forward of the outside-air introducing port 387 and the switching lever 395 being operable from the operator's seat 13 side and pivotally supported by the supporting boss 399, and the switching damper 391 is fixed to the switching lever 395.

According to this configuration, a position between the inside-air introducing port 381 and the outside-air introducing port 387 can be made close, and the inside-air/outside-air switching portion 370 can be formed compactly.

In addition, the working machine 1 includes the fuel tank 390 disposed downward of the inside-air/outside-air switching portion 370. The bottom wall 377 includes the first portion 377a defining a bottom portion of the inside-air/outside-air switching portion 370 and the second portion 377b defining a bottom portion of the filter housing portion 369. The first portion 377a is formed at a position higher than the second portion 377b.

According to this configuration, the height of the fuel tank 390 can be made higher, and the capacity of the fuel tank 390 can be increased.

In addition, the working machine 1 includes the introducing duct 365 disposed upward of the air-conditioner main unit 70 and connected to the air-conditioner main unit 70. The inside-air/outside-air switching portion 370 and the filter housing portion 369 are adjacent to each other in the machine width direction K2. The filter 372 is arranged in a longitudinal direction in which surfaces 372a of the filter 372 face back and forth. The inside-air/outside-air switching portion 370 is connected to the filter housing portion 369 on a back side of the filter 372. The introducing duct 365 includes the introducing port 365c connected to the filter housing portion 369 on a front side of and downward of the filter 372.

According to the configurations, the filter housing portion 369 can be formed to be small in size.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:
    a machine body;
    a traveling device travelably supporting the machine body;
    a hydraulic driving device to hydraulically drive the traveling device;
    a floor frame supported on the machine body via a mounting member;
    an operator's seat on which an operator sits,
    a pedal operable to brake the traveling device,
    an inching valve to change a flow rate of hydraulic fluid supplied to the hydraulic driving device according to operation of the pedal; and
    a cable operably connecting the pedal to the inching valve, wherein
    the floor frame:
        includes a bottom wall having attached thereto a seat base to which the operator's seat is attached, and a floor part provided forward of the bottom wall and the operator's seat; and
        is configured such that the bottom wall is located downward of the floor part;
    the floor part includes an inspection opening in a portion of the floor part that is located forward of the seat base, and an openable cover to close the inspection opening;
    the working machine further comprises:
        an attachment bracket fixed directly to an upper surface of a front portion of the bottom wall at a position below the inspection opening and a rear portion of the openable cover; and a valve bracket attached to the attachment bracket:
the valve bracket includes:
  a valve attachment portion to which the inching valve is attached and which is located below the front portion of the bottom wall; and
  a bracket attachment portion which extends upward from the valve attachment portion and which includes an upper portion extending through an area forward of the bottom wall to reach an area higher than the bottom wall and being attached to the attachment bracket by one or more bolts;
the inching valve is attached to the valve attachment portion to be attached to the bottom wall such that the inching valve is disposed below the front portion of the bottom wall; and
the pedal is attached to the floor frame.

2. The working machine according to claim 1, further comprising:
  a brake shaft to rotate about an axial center by operation of the pedal;
  a brake arm to rotate integrally with the brake shaft;
  a master cylinder to operate by rotation of the brake arm, wherein
  the cable operably connects the brake arm and the inching valve.

3. The working machine according to claim 1, wherein the inching valve includes
  a valve lever operably connected to the cable, and
  a valve main body to which the valve lever is attached, and
  the valve main body changes the flow rate of hydraulic fluid supplied to the hydraulic driving device according to rotation of the valve lever around a vertical axis by operating the pedal.

4. The working machine according to claim 3, further comprising:
  a hydraulic pump to deliver the hydraulic fluid; and
  a hydraulic fluid tank disposed on a lateral side of the inching valve, wherein
  the valve main body includes
    a back surface with a first joint port fluidly connected to a delivery circuit of the hydraulic pump,
    a side surface, facing toward the hydraulic fluid tank, with a second joint port fluidly connected to the hydraulic fluid tank, and
    an upper surface with an operation shaft operably connected to the valve lever.

5. The working machine according to claim 1, further comprising:
  a frame member extended upward from a front portion of the floor frame, the pedal being attached to the frame member;
  a first cable stay fixed to the frame member, one end portion of the cable being attached to the first cable stay; and
  a second cable stay attached to the valve bracket, the other end portion of the cable being attached to the second cable stay.

* * * * *